United States Patent
Lee et al.

(10) Patent No.: US 9,424,167 B2
(45) Date of Patent: Aug. 23, 2016

(54) AUTOMATED TESTING OF AN APPLICATION SYSTEM

(71) Applicant: CGI TECHNOLOGIES AND SOLUTIONS INC., Fairfax, VA (US)

(72) Inventors: Christopher Stephen Lee, Lantana, TX (US); Michael William Monark, Centennial, CO (US); Karen Lynn Thomas, Aurora, CO (US); Wesley Edsel Murphree, Bessemer, AL (US); Kristin Leigh Baca, Thornton, CO (US)

(73) Assignee: CGI TECHNOLOGIES AND SOLUTIONS INC., Fairfax, VA (US)

( * ) Notice: Subject to any disclaimer, the term of this patent is extended or adjusted under 35 U.S.C. 154(b) by 0 days.

(21) Appl. No.: 14/719,137

(22) Filed: May 21, 2015

(65) Prior Publication Data

US 2015/0339213 A1    Nov. 26, 2015

Related U.S. Application Data

(60) Provisional application No. 62/001,501, filed on May 21, 2014.

(51) Int. Cl.
| | |
|---|---|
| G06F 11/36 | (2006.01) |
| G06F 3/0484 | (2013.01) |
| G06F 9/44 | (2006.01) |
| G06F 3/0482 | (2013.01) |
| G06F 3/0485 | (2013.01) |

(52) U.S. Cl.
CPC .......... *G06F 11/3664* (2013.01); *G06F 3/0482* (2013.01); *G06F 3/0484* (2013.01); *G06F 3/0485* (2013.01); *G06F 3/04842* (2013.01); *G06F 11/3672* (2013.01)

(58) Field of Classification Search
None
See application file for complete search history.

(56) References Cited

U.S. PATENT DOCUMENTS

| | | | |
|---|---|---|---|
| 7,451,455 B1 * | 11/2008 | El-Haj | G06F 11/3664 707/999.003 |
| 7,870,504 B1 | 1/2011 | McIntosh et al. | |
| 7,881,491 B2 | 2/2011 | Mizrachi | |
| 8,170,371 B2 | 5/2012 | Zuev et al. | |
| 8,171,391 B2 | 5/2012 | Zuev et al. | |

(Continued)

OTHER PUBLICATIONS

Website Description "TestPlant: Knowledge Base," retrieved on May 21, 2015, available at TestPlant Documentation website: http://docs.testplant.com/PDFs.zip; 25 pages.

(Continued)

*Primary Examiner* — Daxin Wu
(74) *Attorney, Agent, or Firm* — McDermott Will & Emery LLP

(57) ABSTRACT

A system for automatically testing an application system graphical user interface (GUI) includes first and second application servers communicatively connected across a communication network. The second application server retrieves a GUI page provided by the first application server as part of the application system, and identifies text elements and user input objects in an image of the retrieved GUI page. Each user input object is then associated with a text element. Test parameter values are retrieved from a database storing test parameter data, and the application system is tested. In particular, for each user input object of the GUI page, a respective test parameter value is provided that is associated in the database with a same text element as is associated with the user input object. A response of the application system is then monitored.

17 Claims, 23 Drawing Sheets

(56) References Cited

U.S. PATENT DOCUMENTS

| | | | |
|---|---|---|---|
| 8,233,714 B2 | 7/2012 | Zuev et al. | |
| 8,260,049 B2 | 9/2012 | Deryagin et al. | |
| 8,290,272 B2 | 10/2012 | Filimonova et al. | |
| 8,295,590 B2 | 10/2012 | Filimonova et al. | |
| 8,429,612 B2* | 4/2013 | Milov | G06F 11/3664 715/704 |
| 8,548,231 B2 | 10/2013 | Shet et al. | |
| 8,549,478 B2* | 10/2013 | Amichai | G06F 11/3668 717/124 |
| 8,571,262 B2 | 10/2013 | Zuev et al. | |
| 8,571,264 B2 | 10/2013 | Anisimovich et al. | |
| 2003/0131290 A1* | 7/2003 | Weinberg | G06F 11/3688 714/46 |
| 2005/0268171 A1* | 12/2005 | House | G06F 11/2273 714/32 |
| 2009/0217302 A1* | 8/2009 | Grechanik | G06F 8/70 719/320 |
| 2009/0271386 A1* | 10/2009 | Milov | G06F 11/3692 |
| 2009/0273597 A1 | 11/2009 | Chatamballi et al. | |
| 2013/0182949 A9* | 7/2013 | Pankratius | G06F 17/3089 382/165 |
| 2014/0208222 A1* | 7/2014 | Simons | G06F 9/4445 715/740 |
| 2014/0325484 A1* | 10/2014 | Gillaspie | G06F 11/3684 717/124 |
| 2015/0095352 A1* | 4/2015 | Lacey | G06F 17/30011 707/752 |

OTHER PUBLICATIONS

Product Manual "TestPlant: Using eggPlant Functional," retrieved on May 21, 2015, available at TestPlant Documentation website: http://docs.testplant.com/PDFs.zip; 31 pages.

Product Description "Perfecto mobile: MobileCloud Automation" retrieved on May 21, 2015, http://www.perfectomobile.com/sites/default/files/images/content-indexible/mobilecloud-test-automation-ds.pdf; 2 pages.

Product Description, "ATRT Test Manager _QA Testing Tools_ Innovative Defense Technologies" retrieved on May 21, 2015; available at http://idtus.com/products/atrt-test-manager; 3 pages.

* cited by examiner

FIG. 3A

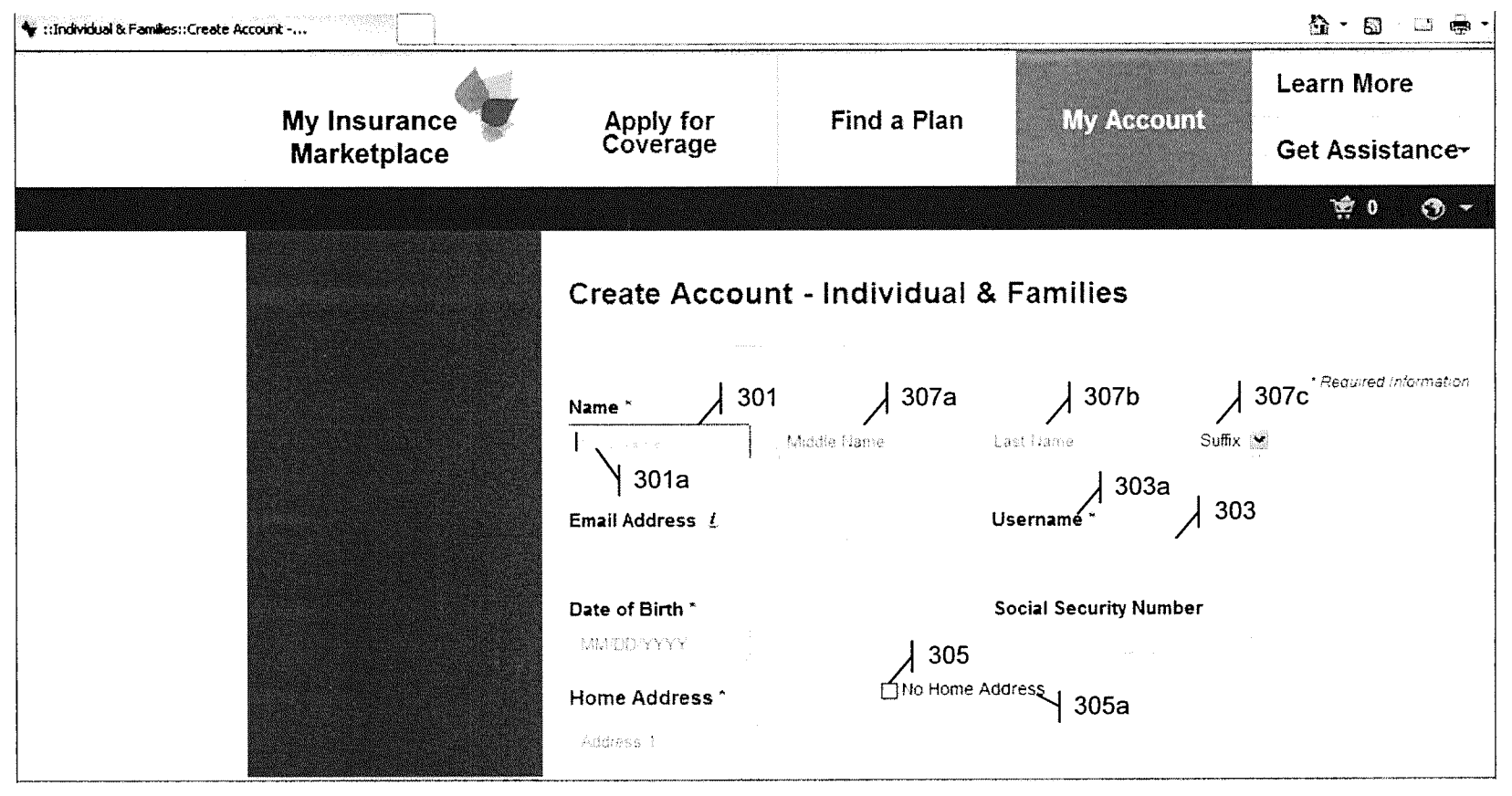

Create Account - Individual & Families

Name * — 301
Middle Name — 307a    Last Name — 307b    Suffix — 307c
— 301a                                    * Required Information
Email Address
                                          Username * — 303
                                                — 303a
Date of Birth *
MM/DD/YYYY
                                          Social Security Number
Home Address *
                  □ No Home Address — 305a
Address 1 — 305

FIG. 3K

SCENARIO DESIGNER

FIG. 4B

DATA MANAGER

| Name | Description | Interface Element | Owner | Private | Active | Type | Last Modified |
|---|---|---|---|---|---|---|---|
| Advanced Search | Advanced Search | Advanced Search | | False | True | System Defined | 1/29/2014 4:41:41 PM |
| Create an Account | Create Account | Create an Account | | False | True | System Defined | 8/26/2014 8:15:27 PM |
| main page | main page | main page | | False | True | System Defined | 6/7/2014 2:40 PM |
| Create an Account Error | Create an Account Error | Create an Account | | False | True | System Defined | 7/8/2014 11:30:21 AM |
| Messages | Messages | Account From Messages | | | | | |
| My Account Information Main | My Account Information Main Page | My Account Information Main | | False | True | System Defined | 2/18/2014 11:02 PM |
| Page | | Page | | | | | |
| Please Sign In | Welcome Please Sign In | Please Sign In | | False | True | System Defined | 1/29/2014 4:46:49 PM |
| Sign In | Sign In | Sign In | | False | True | System Defined | 6/25/2014 11:20:34 AM |
| Account Information | Account Information | Account Information | | False | True | System Defined | 6/20/2014 11:14:32 AM |
| Browse our Plans | Browse our Plans | Browse our Plans | | False | True | System Defined | 1/20/2014 12:30:27 PM |
| Shopping Cart | Shopping Cart | Shopping Cart | | False | True | System Defined | 1/29/2014 4:59:05 PM |

FIG. 4C

Name: Account Information
Description: Account Information

Private: ☐  Interface Element | Enter Scenario | Verify Scenario

Data: Add Columns: 0   Add Rows: 0   Add

Apply Special Value: None  Null  Persistent Store  Persistent Use  Run-Time Store  Run-Time Use  Clear Cell

|< < < 1 >> >|

| # | Test Condition | A | B | C | D | E | F |
|---|---|---|---|---|---|---|---|
| | | Gender - Male | Gender - Female | First Name | Last Name | Date of Birth | E-Mail Address |
| 2 | Create Account using incorrect date format | Click | | Bill | Johnson | January 1, 1960 | billjohnson@msn.com |
| 3 | Create Account with incorrect password requirements | Click | | Sally | Fields | 06/24/1963 | sally@cgi.com |
| 4 | Create Account without First Name | | Click | | Doe | 11/1/1924 | @cgifx.random_email.test.com|-|@storeResults |
| 5 | Create Female Account | | Click | Stacy | Doe | 11/1/1924 | @cgifx.random_email.test.com|-|@storeResults |
| 6 | Create Male Account | Click | | John | Doe | 01/30/1982 | hw@email.com |
| 7 | Kim's New Account Test Condition | | Click | Kim | Weather | 02/27/1966 | hw@msn.com |
| 8 | Time test | | Click | Kristin | Baca | 01/01/1970 | @cgifx.random_email.test.com|-|@storeResults |
| 9 | Verify Empty Values | | | <NULL> | <NULL> | <NULL> | <NULL> |
| 10 | Verify Female - My Account Information after creating Stacy Doe | | | Stacy | Doe | 11/1/1924 | $(email) |
| 11 | Verify Male - My Account Information after creating John Doe | | | John | Doe | 01/30/1982 | $(email) |

Save  Cancel  Make Copy

US 9,424,167 B2

AUTOMATED TESTING OF AN APPLICATION SYSTEM

CROSS-REFERENCE TO RELATED APPLICATION

This application claims the benefit of U.S. Provisional Patent Application No. 62/001,501, filed on May 21, 2014 in the United States Patent and Trademark Office, the disclosure of which is incorporated by reference herein in its entirety.

TECHNICAL FIELD

The present invention relates to a system and methods for automating the testing of an application system having one or more graphical user interfaces (GUIs) by automating interactions with the GUIs of the application system under test (AUT).

BACKGROUND

Traditional automation approaches for testing software systems require a well-trained professional test designer to undertake a very time consuming and expensive process to configure the automated testing software to perform a test of the software system. In particular, the test designer must generally be a programmer rather than a manual tester such as is commonly used to staff testing projects. The setup for these traditional approaches occurs prior to any test execution and is very costly. The maintenance of these tests is also a very costly process of executing test cases, encountering failures, analyzing the failures, making coding or test case updates, and executing the test again to reach a positive run status. A need therefore exists for streamlined and automated interaction systems that can automatically test complex software systems.

SUMMARY

The teachings herein alleviate one or more of the above noted problems with the testing application systems having one or more graphical user interfaces (GUIs).

In accordance with one aspect of the disclosure, a method is provided for automatically testing an application system graphical user interface (GUI). The method includes retrieving, in a computer communicatively connected to an application server providing the application system, a GUI page provided by the application server as part of the application system. A plurality of text elements of the GUI page are identified in an image of the retrieved GUI page. A plurality of user input objects of the GUI page are identified in the image of the retrieved GUI page. A text element of the plurality of identified text elements is associated with each of the plurality of identified user input objects. A plurality of test parameter values are retrieved, based on the text elements associated with each of the plurality of user input objects, from a database storing test parameter data. Each test parameter value of the plurality of test parameter values is associated in the database storing test parameter data with a corresponding text element associated with one of the plurality of user input objects. In turn, the application system provided by the application server is tested by, for each respective user input object identified in the GUI page, performing a function to: provide, in the respective user input object of the GUI page, the respective test parameter value that is associated in the database storing test parameter data with a same text element as is associated with the respective user input object of the GUI page. A response is monitored of the application system to the providing of the respective test parameter value to each user input object identified in the GUI page.

The user input objects on the GUI may include at least one of a button, a text input field, a list or combo box, a checkbox, and a radio button. The plurality of test parameter values may include at least one of a click command to activate a button user input object, a text string for input into a text input field user input object, identification of an item to select in a list or combo box user input object, a check or uncheck command for input into a checkbox user input object, and identification of an item to select in a radio button selection user input object.

The associating of a text element of the plurality of identified text elements with an identified user input object may include associating with the identified user input object a text element that is located proximate to or is overlapped with the identified user input object in the GUI page.

The method may further include determining a type of a user input object of the plurality of user input objects of the GUI. The retrieving may include retrieving, based on the text elements associated with each of the plurality of user input objects and based on the determined types of the each user input object, the plurality of test parameter values from the database storing test parameter data, wherein each test parameter value of the plurality of test parameter values is associated in the database storing test parameter data with the corresponding text element associated with one of the plurality of user input objects and associated in the database storing test parameter data with the type of the one user input object.

The test parameter values "M", "male", "F", and "female" may be associated with a text element "Gender" and with a radio button type of user input object in the database storing test data. The test parameter value "jdoe@gmail.com" may be associated with a text element "E-Mail Address" and with a text input field type of user input object in the database storing test data. The test parameter values 'check' and 'uncheck' may be associated with a checkbox type of user input object in the database storing test data.

The method may further include receiving, from a test developer, test parameter values to associate with one text element of the plurality of identified text elements, and storing the received test parameter values in the database storing test parameter data in association with the one text element. The test parameter values may be received from the test developer in response to prompting the test developer for test parameter values to associate with the one text element identified in the GUI page. The test developer may be prompted for the test parameter values following the identifying of the pluralities of text elements and user input objects and prior to the testing of the application system.

The monitoring of the response of the application system may include storing a log of monitored responses of the application system including stored screenshots of the GUI page following the providing of the respective test parameter values in the respective user input objects of the GUI page.

The testing of the application system may include executing a test case comprising an ordered sequence of actions to be performed on the application system providing the application system. The ordered sequence of actions may include actions to provide the respective test parameter values in the respective user input objects of the GUI page.

The retrieving of the plurality of test parameter values may include retrieving different pluralities of test parameter values for each of the plurality of identified user input objects. The testing of the application system may include repeatedly executing the test case on the application system by providing different combinations of test parameter values in the user input objects of the GUI page during each execution of the test case, and monitoring the response of the application system to each different combination of test parameters.

The identifying of the plurality of text elements of the GUI page may include performing optical character recognition (OCR) of the GUI page to obtain text information of each text element of the GUI page and to obtain location information of each text element on the GUI page. The identifying of the plurality of user input objects of the GUI page may include performing contour analysis of the GUI page to identify the presence, type, and location of each user input object of the GUI page.

The identification of the pluralities of text elements and user input objects of the GUI page may include automatically scrolling through the GUI page to obtain a plurality of images of different scrolled portions of the GUI page, and identifying text elements and user input objects in each image of the plurality of images of different scrolled portions of the GUI page. The identifying of the plurality of user input objects may include automatically expanding list or combo boxes of the GUI page and obtaining text information from the expanded list or combo boxes, and storing the obtained text information from each expanded list or combo box with the information on the presence, type, and location of the list or combo box.

The providing of the respective parameter values in the respective user input objects of the GUI page may be performed at least in part based on the identified location of each user input object on the GUI page.

In accordance with a further aspect of the disclosure, a system is provided that includes a communication network, a first application server connected to the communication network and providing across the communication network an application system having a graphical user interface (GUI), and a second application server communicatively connected to first application server across the communication network, and configured to access the application system provided by the first application server across the communication network. The second application server may configured to perform functions to: retrieve a GUI page provided by the first application server as part of the application system; identify, in an image of the retrieved GUI page, a plurality of text elements of the GUI page; identify, in the image of the retrieved GUI page, a plurality of user input objects of the GUI page; associate with each of the plurality of identified user input objects a text element of the plurality of identified text elements; retrieve, based on the text elements associated with each of the plurality of user input objects, a plurality of test parameter values from a database storing test parameter data, wherein each test parameter value of the plurality of test parameter values is associated in the database storing test parameter data with a corresponding text element associated with one of the plurality of user input objects; test the application system provided by the first application server by, for each respective user input object identified in the GUI page, performing a function to provide, in the respective user input object of the GUI page, the respective test parameter value that is associated in the database storing test parameter data with a same text element as is associated with the respective user input object of the GUI page; and monitor a response of the application system to the providing of the respective test parameter value to each user input object identified in the GUI page.

In accordance with a further aspect of the disclosure, a non-transitory machine-readable medium is provided that includes instructions stored therein, which when executed by a processor, cause the processor to perform operations for automatically testing an application system graphical user interface (GUI). The operations include operations to: retrieve, in a computer communicatively connected to an application server providing the application system, a GUI page provided by the application server as part of the application system; identify, in an image of the retrieved GUI page, a plurality of text elements of the GUI page; identify, in the image of the retrieved GUI page, a plurality of user input objects of the GUI page; associate with each of the plurality of identified user input objects a text element of the plurality of identified text elements; retrieve, based on the text elements associated with each of the plurality of user input objects, a plurality of test parameter values from a database storing test parameter data, wherein each test parameter value of the plurality of test parameter values is associated in the database storing test parameter data with a corresponding text element associated with one of the plurality of user input objects; test the application system provided by the application server by, for each respective user input object identified in the GUI page, performing a function to provide, in the respective user input object of the GUI page, the respective test parameter value that is associated in the database storing test parameter data with a same text element as is associated with the respective user input object of the GUI page; and monitor a response of the application system to the providing of the respective test parameter value to each user input object identified in the GUI page.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-3K are screenshots and other illustrative images showing operation of the automation tool of FIG. 1A FIGS. 4A-4E are further screenshots and other illustrative images showing operation of the automation tool of FIG. 1A.

DETAILED DESCRIPTION

Figure 1A:
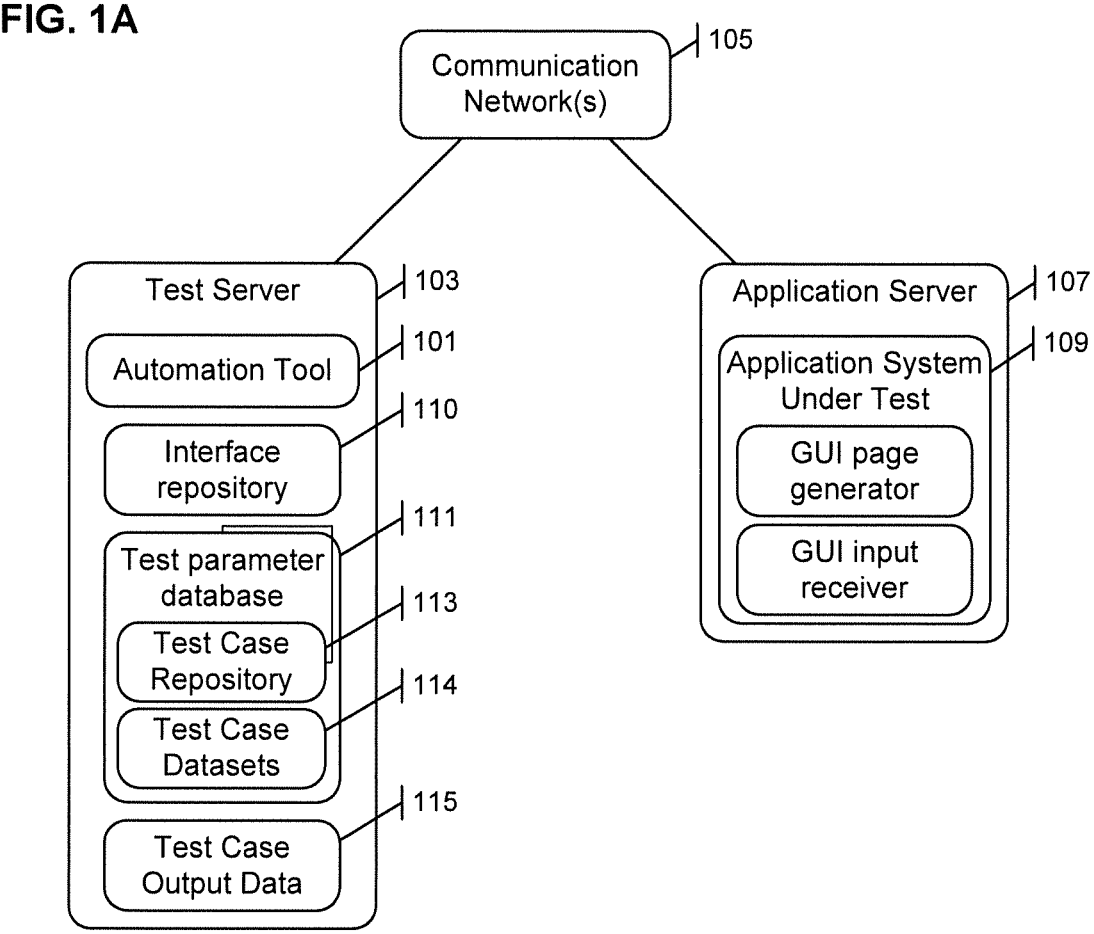
FIGS. 1A and 1B are high-level functional block diagrams of systems of networks and servers that provide communications and processing to implement the automated testing service.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to the automated testing of complex software systems. Systems and methods are provided which use optical character recognition (OCR), pattern matching, image matching, positional, and other visual and shape detection algorithms to learn a graphical user interface (GUI) of a software application with the intention of interacting with it repeatedly as a user would for the purpose of test automation.

The automated test system performs learning activities and repeatable actions. The learning activities and repeatable actions are performed by analyzing images of the GUI to identify components of the GUIs without requiring access to the programming code used to generate the GUI. For example, the automated test system is able to recognize common GUI objects or fields configured to receive user input such as buttons, text fields, list and combo boxes, checkboxes, radios; and uncommon objects or fields such as tables, grids, static text, images, and others based on screenshots (or other images) of the GUIs. The system then gathers visual information about the current state of these user input objects. For example, the state is the current presentation of a GUI user input object, such as an indication of whether a checkbox is checked or unchecked, whether a text field contains data inside itself or not, whether a field is editable or read only, whether a field is required or not, or the like. The user input objects are generally GUI fields or objects which are visually presented to a user and allow a user to manipulate the information inside the fields. The GUI fields or objects form part of the GUI interface of an application system. The automated test system interacts with the user input objects by following the patterns a user would follow to interact with the objects, such as by clicking buttons, selecting items, entering data, and checking/unchecking checkboxes. Specifically, the automated test system interacts with the user input objects in accordance with test parameters outlined in each of a plurality of test cases or test scenarios (e.g., the automated test system may check a checkbox in one test case while leaving it unchecked in another test case, in accordance with the test parameters of different test cases). The automated test system stores GUI data including the accumulated knowledge regarding the user input objects and when the objects or similar objects/fields are presented by the system such that the system is able to repeat the actions which were learned. As such, rather than requiring users or testers to capture object and field properties and information and define the interactions up front, the system automatically captures the objects' location details and interprets the actions required based on knowledge gathered and learned about the objects and based on automated interactions of the system with the user input objects. The system can thus automatically determine object type, acceptable values, and other learned behaviors. The system will also store the learned capabilities, states or default values of the user input objects or fields, and make the objects/fields and associated capabilities available to testers for creating test scenarios and test cases during test development.

As an example, when the automated test system encounters a checkbox it will learn that the user input object is a checkbox and store the location, logical name of the object, and attached text of the checkbox for later access by testers. The automated test system also stores the object type capability information indicating the possible ways in which a user can interact with this object type. In the example of a checkbox, the object type capability rules can provide the option for users to check or uncheck the box as valid values for interacting with the object in test scenarios and test cases. In the case of a list box, the system will recognize the list box (e.g., a list box including a list of selectable options, such as a list of U.S. states), open it and obtain the values listed in the box, and store the values and make them available for testers who encounter the object to select an appropriate value from the stored list for their test scenario and test case.

For a process example, if testing of a new application is to be automated and the system encounters an unknown page, the system will automatically learn the objects on the page. For example, the system may identify on the page a set of radio buttons for Male and Female, and make the objects available for creating test cases. If a user desires to select the "Male" radio button as a step in the test case when the page has been navigated to even if this is the first encounter of the radio, then the system will locate the radio button based on the "Male" qualifier, analyze the current state of the radio (e.g., selected or unselected) via image analysis, and perform the correct action to ensure that the state of the radio is set to "Male" in accordance with the step in the test case.

In contrast to the automated test system outlined herein, existing software automation test tools require users to provide physical properties and identification information data of user input objects/fields on a GUI and also desired code or action information to interact with particular fields prior to test execution. Advantageously, the system outlined herein is able to automatically analyze a screenshot of a GUI of an application prior to test execution or during test execution and learn the objects and their logical reference names without requiring prior user definition of the fields, field types, physical properties, or actions desired. The system is able to interact immediately with the fields on the application under test given logical, visual, or relative position identifiers for the fields.

More specifically, in earlier systems for testing software, tools for scripting automated cases used mouse and keyboard movements and key presses to interact with the GUI under test. However, such scripting tools were blind of the context of the GUI and therefore prone to error and failure if any minor change was made to the GUI or to the testing environment. In order to improve on the prior systems and remove the need to maintain fragile scripts, new tool technology allowed finding objects based on physical properties such as name and ID attributes in the code of the applications under test. However, such methods rely on having access to the code of the application under test, such as source code or data definitions, and therefore have limited applicability. Further, such methods rely on programmers to review the code to create test cases, and the methods are therefore very costly and slow to implement. Further, maintenance is difficult as programmers are also needed to make adjustments to tests any time the original code is modified or updated. More recently, frameworks and other more complex architectures which mimic full scale development projects were made to run on top of the execution tools. These frameworks rely on functional decomposition, keyword driven, data driven, and business process driven frameworks to make the maintenance easier and allow non-programmers to create and maintain automation. Unfortunately, these frameworks run on top of more complex programmer tools, and thus still require programmers and experts to setup the projects, often taking two to four weeks or more for each application to get it into a state ready for automation. Additionally, programmers are needed anytime the test tool is not interpreting object properties correctly, or if changes are made to the properties of objects or pages, or new objects are added, moved, deleted, or any type of modifications are made with the objects from which the test tool has recorded in its object mapping. Furthermore, most applications require extensive workarounds with the common market leading automation tools to work with the complex applications created today. As a result of the shortcomings of established testing systems, it can take four to ten times longer to automate a test case than it took to create and execute the test initially manually. Further, the automation of a test case using established testing systems requires a great deal of effort for automation programmers to setup and manage every automation project. Because of the customizations needed in the coding centric automation tool to recognize each new application, and because of the need for skilled coding resources to do this work, test automation using established systems is only viable for regression testing or only achieves positive return on investment (ROI) after four or more releases.

To address deficiencies in earlier systems for testing software, improved automated interaction systems and methods are provided. The systems and methods include an automation tool that sees applications as users see the applications and their GUIs, and processes the information seen in the GUI to drive operation of the automation tool. The automation tool searches for visible text and user input objects on the GUI screens of applications, and then finds and identifies the associated objects and interacts with the objects. The tool relies only on the attached text, associated images, or relatively positioned objects, images, or text seen in the GUI for operation without requiring access to the programming code of the GUI. With this approach, the tool is able to reduce or eliminate the need for automation test tool programmers digging into the physical properties of objects and writing programming language scripts for the test cases. Thus, there is no longer a need to navigate the application and record scripts or inspect elements to find physical name properties. Further, it is no longer necessary to write code in a language and syntax specific to every individual common test tool. The automation tool in the present invention incorporates scanning and OCR technology in order to see applications and their GUIs as the testers do. The testers are thus able to start work immediately on new applications without requiring coding resources to setup a testing structure beforehand. Further, the testers are able to fix test cases executed by the automation tool themselves even when development of the application under test causes changes in the application under test to arise that traditionally have been addressed by programmers. The test cases can be created without the application code and require no coding. With the integration of the scanning and OCR technology, the automation tool can provide more efficient testing for software applications and also all testers on the quality assurance projects are able to take part in the automation testing effort.

Details of the functioning of the automation tool, as well as of the computers and servers connected for processing and execution of the automation tool, are shown in the attached figures and are described in detail below.

FIG. 1A is an illustrative block diagram showing interconnected servers that may be used to implement the automation tool. As shown in FIG. 1A, the automation tool 101 may execute on a test computer or a first application server 103 that is communicatively connected (e.g., via wired or wireless communication network(s) 105) to a second application server 107 providing the application system under test 109.

As part of providing the application system, the application server 107 executes the application system under test 109. The application system under test 109 includes a GUI page generator which, during execution of the application system 109, generates graphical user interface (GUI) pages including user input objects such as buttons, text input fields, list or combo boxes, checkboxes, and radio buttons used for interacting with the application system. The application system also can generate text elements, icons, graphic images or other objects which are presented on the GUI page. In general, a user of the application system interfaces with the application system by providing input (e.g., text input and/or user selections) via the user input objects of the GUI pages such that the input can be processed by the application system 109. A GUI input receiver of the application system under test 109 captures and processes the received input. In some examples, the received input is used by the application system 109 to generate further GUI pages. In our example, the automation tool 101 executing on the test computer 103 interfaces with the application system under test 109 to identify text and user input objects on the GUI pages, and to interface and interact with the application system under test 109 via the GUI pages generated by the application server 107.

An illustrative GUI page of the application system under test 109 is shown in FIG. 3A. In the GUI page, each user input object (e.g., 301, 303, 305) of the GUI page has one or more text elements associated therewith, such as text labels or attached text (e.g., 301*a*, 303*a*, 305*a*) indicative of the information that should be entered by the user or indicative of the action that will be taken in response to the user selecting or activating the object. Generally, a text element is any text shown near a field or user input object on a GUI page which signify the field's purpose to the user of the application system. During testing of the application system 109, the automation tool 101 retrieves a GUI page provided by the application server 107, and identifies the text elements and user input objects of the GUI page based on an image (e.g., a screenshot) of the GUI page. The automation tool 101 then associates user input objects with corresponding text elements, for example based on relative position or proximity of the text element and user input object. The text element associated with each user input object serves as a label for the user input object, and analysis of the type of user input object can allow the automation tool 101 to determine the type of data that should be inputted into the user input object. Information on the identified user input objects, text elements, associations between the objects and text, and characteristics of the objects are stored by the automation tool 101 in the interface repository 110. The stored user input objects and text elements are used to identify test parameters and develop tests of the application system 109. In turn, as part of performing testing, the automation tool 101 retrieves test parameters from the test parameter database 111 storing test scenarios and test data values.

Generally, test scenarios are a set of test steps ordered in sequence to perform a test or portion of a test in an application system under test 109. A test scenario specifies a series of steps without providing any associated test data; the test data is provided as part of a test case that is associated with the scenario. Multiple test scenarios can be placed in order to create a test sequence and then reused in many test cases with different associated test data to create multiple test cases of a given test sequence. A test sequence is a flow of multiple test scenarios which, when specific test data is supplied, comprises a test case. A test case is associated with test data which returns specific results when the test case is executed on an application system under test. Test data are input data values or selections that are associated with test steps and are input to the GUI page during execution of a test case. The test parameters database 111 includes test scenarios, test cases, test sequences, test steps and test data that are used as part of executing test cases for testing the application system 109.

The particular test data values are associated with user input objects on the GUI page based on the text element associated with each user input object. For example, test data values "M", "male", "F", and "female" may be associated with a text element "Gender," and may be retrieved if a user input object is identified as being associated with a "Gender" text element. A test parameter value "jdoe@gmail.com" and various other examples of email addresses may be associated with a text element "E-Mail Address" and may be retrieved if a text input field type is identified as being associated with an "E-Mail Address" label. The automation tool 101 can then perform testing by inputting into corresponding user input elements of the GUI page various combinations of the retrieved test parameter values for each user input element, and by monitoring the response of the application system 109 to each inputted combination of test parameter values.

The application servers 103 and 107 may be server or other general-purpose computers that comprise a central processor or other processing device, an internal communication bus, various types of non-transitory memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for performing functions associated with the automation tool 101 and the application system 109. The software code is executable by the general-purpose computer that functions as the application computer 103/107. Execution of the code for the automation tool 101 by a processor of the computer platform enables the platform to implement the methodology for automatically testing an application system 109 and the associated graphical user interface (GUI) in essentially the manner performed in the implementations discussed and illustrated herein. Execution of the code for the application system under test 109 by a processor of the computer platform enables the platform to implement the methodology for providing the application system 109 and the associated graphical user interface (GUI) in essentially the manner performed in the implementations discussed and illustrated herein.

Figure 1B:
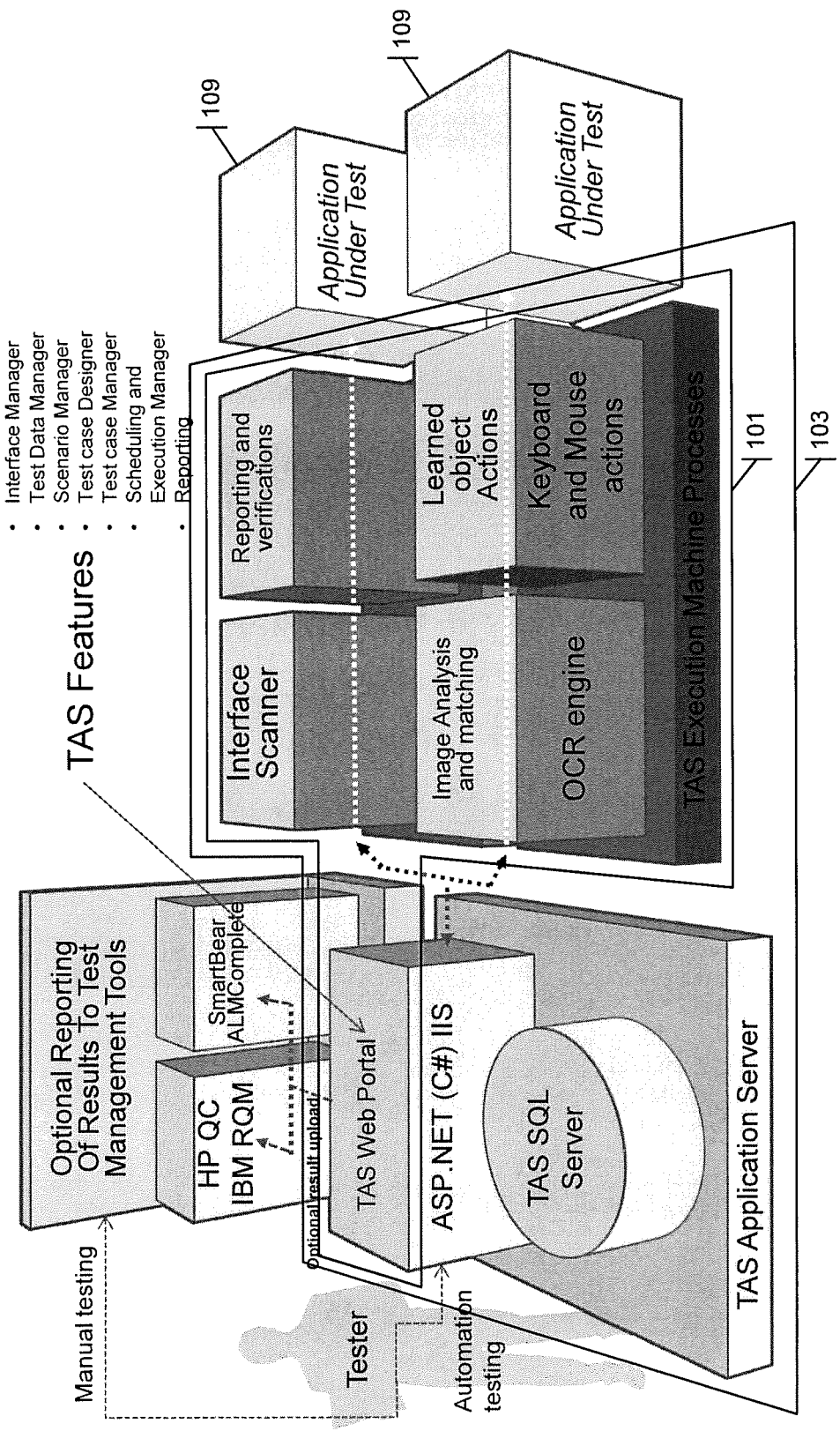

FIG. 1B is an alternative representation of the interconnected servers that may be used to implement the automation tool. As shown in FIG. 1B, the automation tool 101 is implemented on a test automation system (TAS) that is communicatively connected to the application system under test 109. A human tester may interface with the TAS to perform manual testing of the application system 109, and/or the tester may oversee automated testing of the application system 109. The automation tool 101 includes an interface scanner, an engine for performing optical character recognition (OCR) for image analysis and matching, processing units for performing reporting and verifications, learned object interactions, and keyboard and mouse actions. Examples of OCR systems include Abbyy and Tesseract. The automation tool 101 is further configured for performing configuration, functioning as an interface manager, a test data manager, a test scenario manager, a test case designer, a test case manager, a scheduling and execution manager, and for reporting. As an example, configuration allows for OCR parameters to be defined to direct TAS to increase the accuracy of OCR such as supplying font or retry options, template mapping information such as where text elements might occur in relation to user input objects, and other configuration type information for the OCR engine.

FIGS. 2A-2D are flow diagrams illustratively showing the operation of the automation tool 101. Functioning of the automation tool 101 will thus be described in detail in relation to these figures.

In operation, the automation tool 101 scans or captures the GUI page, window, screen, screenshot, or image of the application system 109 to be tested. The scanning and capturing can be performed by the interface scanner (see, e.g., FIG. 1B). Once the GUI page has been captured and an image is made of the GUI page, the automation tool 101 proceeds to analyze, learn and categorize all the different text elements, images, GUI objects or other elements on the GUI interface, and save the information in the repository 110. Specifically, the automation tool 101 performs steps 201 and 203 in response to determining that a new GUI page has been output and presented by the application system 109. In step 201, the automation tool 101 performs optical character recognition (OCR) on the captured image of the GUI page to identify all text on the page and obtain location information for the text on the page. In parallel, the automation tool scans the GUI page to identify all user input objects (or other user interface objects and fields) on the page in step 203. The objects identified through the scan of the page include any objects through which a user of the application system 109 can provide input, such as buttons, text fields, list and combo boxes, checkboxes, radios. The objects identified through the scan can further include other objects such as tables, grids, static text, images, accordion menus, and the like. The automation tool 101 may further identify which objects/fields are required fields requiring user input, and may store the information in the interface repository 110.

In particular, the interface repository 110 may store GUI page level data. The GUI page level data can include one or more of: a GUI page logical name, GUI page logical name mapping rules, template mappings and related information, layout templates for the interface, images of GUI pages, images of portions of GUI pages, CMCLC ratio information, epicenter of change (EoC) calculation information, interface delta (ID) information, degree or delta of change used for ID calculation, contour analysis information, pixel pattern matching information, path analysis information, information on timing of changes observed for ID, positional structure information, location strategies information, relative position calculation information. The interface repository 110 may further store text element level data, including one or more of: logical name information, associations between objects and text, text images, text coordinates, template mapping OCR configuration parameters, percent accuracy required for positive match (as it relates to OCR), and identifier data. The interface repository 110 may additionally store user input object level data, including one or more of template mapping information (e.g., layout templates for user input objects), user input object mapping rules, user input object images, object logical name information, associations between objects and text, object type information, bounding box information, location/position information, coordinates, learned patterns for object interaction information, learned action interaction, valid values for objects, default values for objects, state of objects, required marker information, relative position links, relative position identifiers, relative position calculation information, default number of scrolls required to access objects, and identifier data.

In step 205 and 207, the automation tool 101 maps the OCR identified text elements to the user input objects identified on the page, and assigns a unique logical name to each identified object based on mapping rules. Specifically, text to user input object mapping rules define rules to link OCR text elements to a user input objects on a GUI image. Mapping rules include, but are not limited to, rules to associate text contained within an object with the object, rules to associate text adjacent to an object with the object, or rules to associate with an object text that is positioned relatively near the object but is not directly adjacent to the object (in which case the rule may specify an index or identifier, such as to the right of, to characterize the relationship between the objet and text). Mapping rules are defined by testers as part of configuration. For example, the OCR text and objects can be mapped to each other based on overlap (e.g., in the case of a text label that overlaps or is superimposed on an object), proximity (e.g., in the case of a text label that is placed adjacent to the object), and/or relative position (e.g., a text that is located immediately left of, immediately right of, and/or immediately above or below an object can be associated with the object). In the example of FIG. 3A, for example, the OCR text "First Name" 301*a* may be mapped or associated with text field object 301 based on overlap. In addition, the OCR text "Name*" may be mapped or associated with the text field objects 301 and 307*a-c* based on proximity and relative position. The OCR text "No Home Address" 305*a* is mapped or associated with checkbox 305 based on proximity and relative position. Further, each object can be assigned a unique logical name that may be based on the OCR text associated with the object. For example, the text field object 301 can be assigned the name "Name*—First Name" based on the OCR texts "Name" and "First Name" that are located proximate to and thereby associated with the test field object 301.

Further details of the processing performed by the automation tool 101 are shown in steps 209-217. Specifically, in step 209, the automation tool 101 learns characteristics of all of the user input objects identified on the GUI page. Learning is an automated process and does not require any manual actions by testers. The automation tool will click the dropdown for combos, and check the state of checkboxes and radios, and other activities which are a completely automated process of learning the page elements and layout. The learning includes, for each identified user input object, determining a type of the object (step 211). The learning further includes capturing a current state of the object (step 213), such as capturing whether a checkbox is currently checked or unchecked, whether a text field currently includes text, whether a radio button is selected or unselected, or the like.

Additionally, in step 215, the automation tool 101 captures images, coordinates, and/or location strategy for all known user input objects and elements from the GUI page. Capturing the location strategy of a user input object includes determining the location of the object relative to the GUI page and/or relative to other user input objects on the page. For example, an object may thus be identified as being aligned with other objects or with features of the GUI page, aligned with a grid, located in a particular cell of a table, configured to remain adjacent to (e.g., to the right, to the left, above, or below) other objects, or the like. In some examples, the location strategy is determined based on the overall layout of objects on the GUI page, and/or based on known layout templates for the interface (e.g., step 225). In step 217, the automation tool 101 identifies required fields by OCR or image analysis of the required marker. A required marker, such as the commonly used * after the attached text of a field, indicates a required field.

In the case of user input objects such as list boxes, combo boxes, and lists with checkboxes embedded, the automation tool 101 further causes the list or combo to open so as to record all values included in the list or combo box (step 219). Specifically, the automation tool 101 records all available values which can be selected, checked, or clicked. The recorded values are stored in the interface repository 110 in order to make the capabilities available to users of the system for creating test cases. More generally, the automation tool 101 scrolls through the GUI page, opens and scrolls objects on the GUI page, expands accordions, trees, and other collapsible GUI elements in order to uncover objects, text, images, or GUI elements which are hidden by the accordion. The automation tool 101 then captures OCR values so as to catalog all objects and text on the GUI page (step 221). In this way, the automation tool 101 can learn all objects on a page, then scroll any objects with scrolls, or the entire page if scrollbars are available and capture all the objects below the fold of the GUI page. The automation tool 101 can further record the number of scrolls required to access objects below the fold (e.g., measured in number of page-length scrolls) or inside scrollable objects like combos and lists (e.g., measured in number of combo/list box length scrolls) in order to improve performance during execution. As each execution occurs, the automation tool 101 further makes updates as needed to learn any changes which affect scrolling considerations.

Once the automation tool 101 has completed its learning of the characteristics of all objects on the GUI page, the automation tool 101 determines a logical name for the GUI page interface (step 223), and stores all objects and their characteristics in the interface repository 110 or other appropriate database under the logical name for the page. The logical name for the GUI page or window may be based on the text retrieved from a title bar, a header, or a visible page name of the retrieved GUI page. This can be based on locations given in the template mapping of the application system under test 109 in the configuration of the TAS system. The template mapping consists of standards for the GUI page within an application system. For example, a template mapping could state that the logical name for user input objects could be found on top left of the user input object and the logical name for the GUI page is in the title bar at the top left corner of the page. If the template mapping is not available, then the logical name for the GUI page could be determined by capturing the title bar text, the URL, and any large font header with no adjacent elements near the top of the page and the system would choose which of the options is a concise string which appears to be unique on pages in the application. If the titles of pages are the same on all screens, this is ignored. If there is no header text in the body of the page near the top without an adjacent element, then the final portion of the URL after the server name would be used as the logical name and could be manually updated by the user from the interface repository if this name isn't good enough. An image of the page would also be available in the interface repository for the user to reference in knowing what page it is.

Figure 3B:
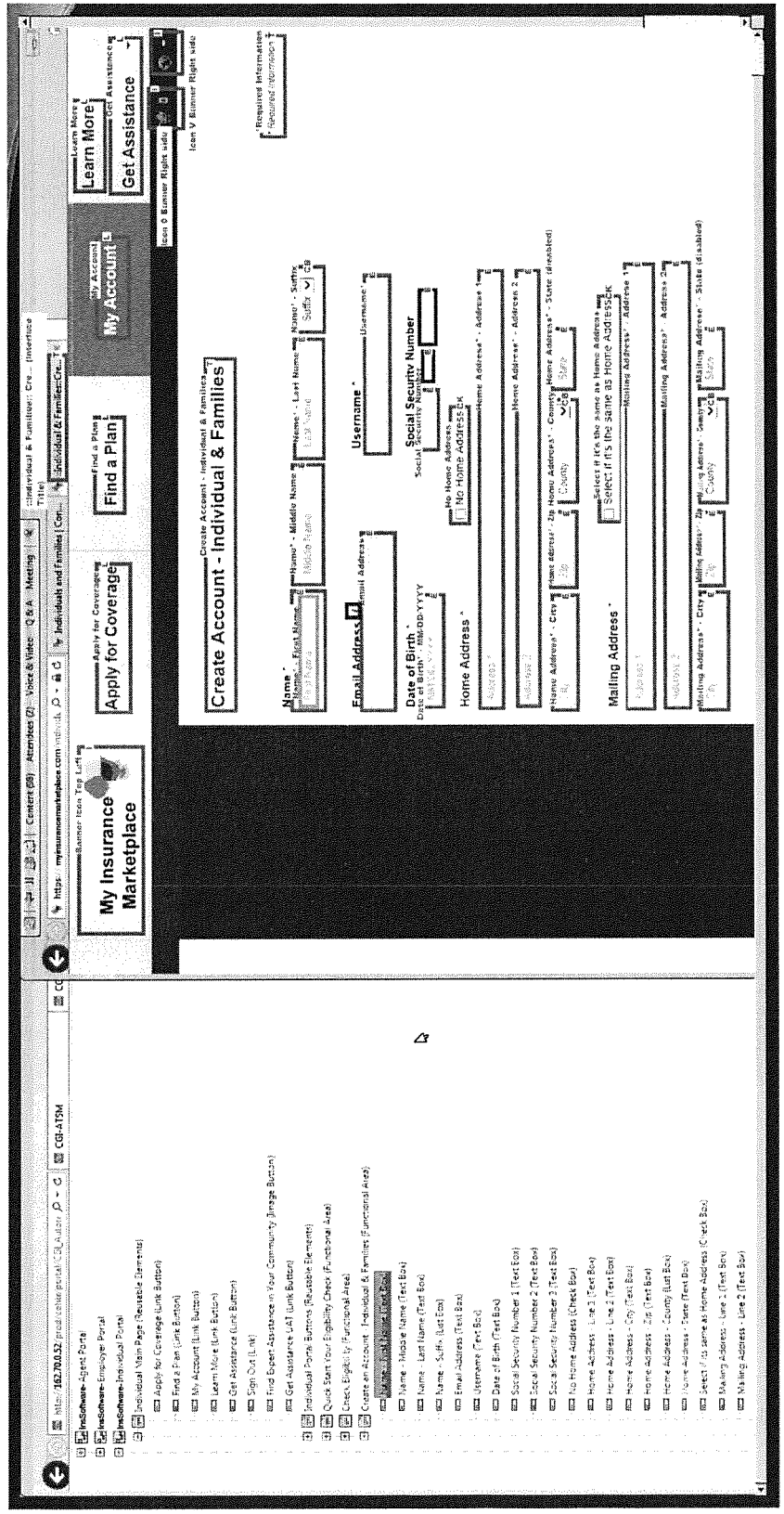

FIG. 3B shows an example of the GUI page of FIG. 3A in which each user interface object has been identified and the OCR text has been associated with each object on the page. As shown in FIG. 3B, which represents a screen-shot from a GUI interface of the automation tool 101, a left-hand portion of the screen includes a list of all objects that have been identified as part of scanning the GUI page. Each listed object is identified along with the object type (e.g., Text Box, Check Box, List Box, Link Button, Image Button, Link, or the like). The list of all objects shown in FIG. 3B forms part of the information stored in the interface repository 110.

Figure 2A:
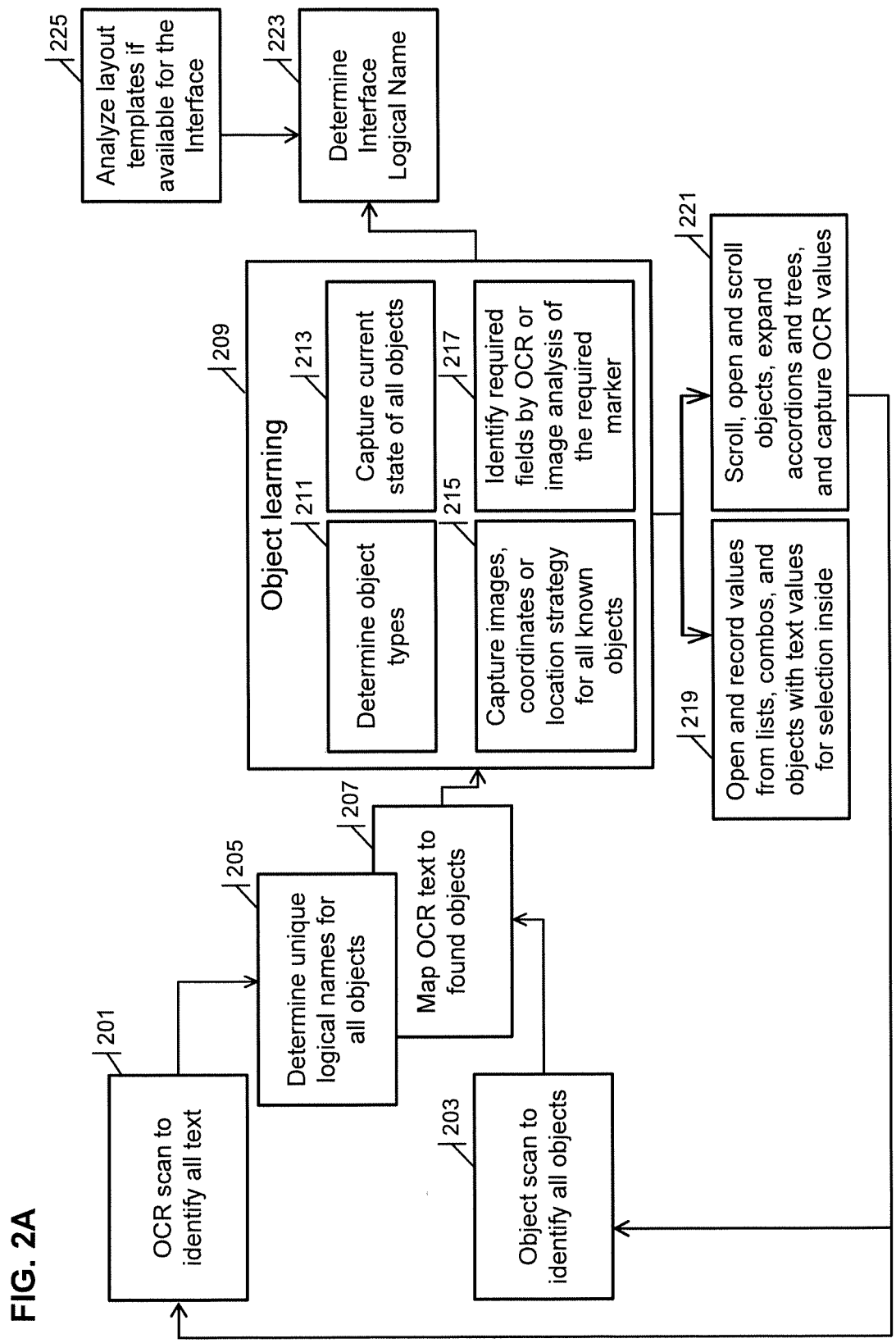
FIGS. 2A-2D are high-level functional block diagram illustratively showing the operation of an automation tool like that shown in FIG. 1A.
Figure 2B:
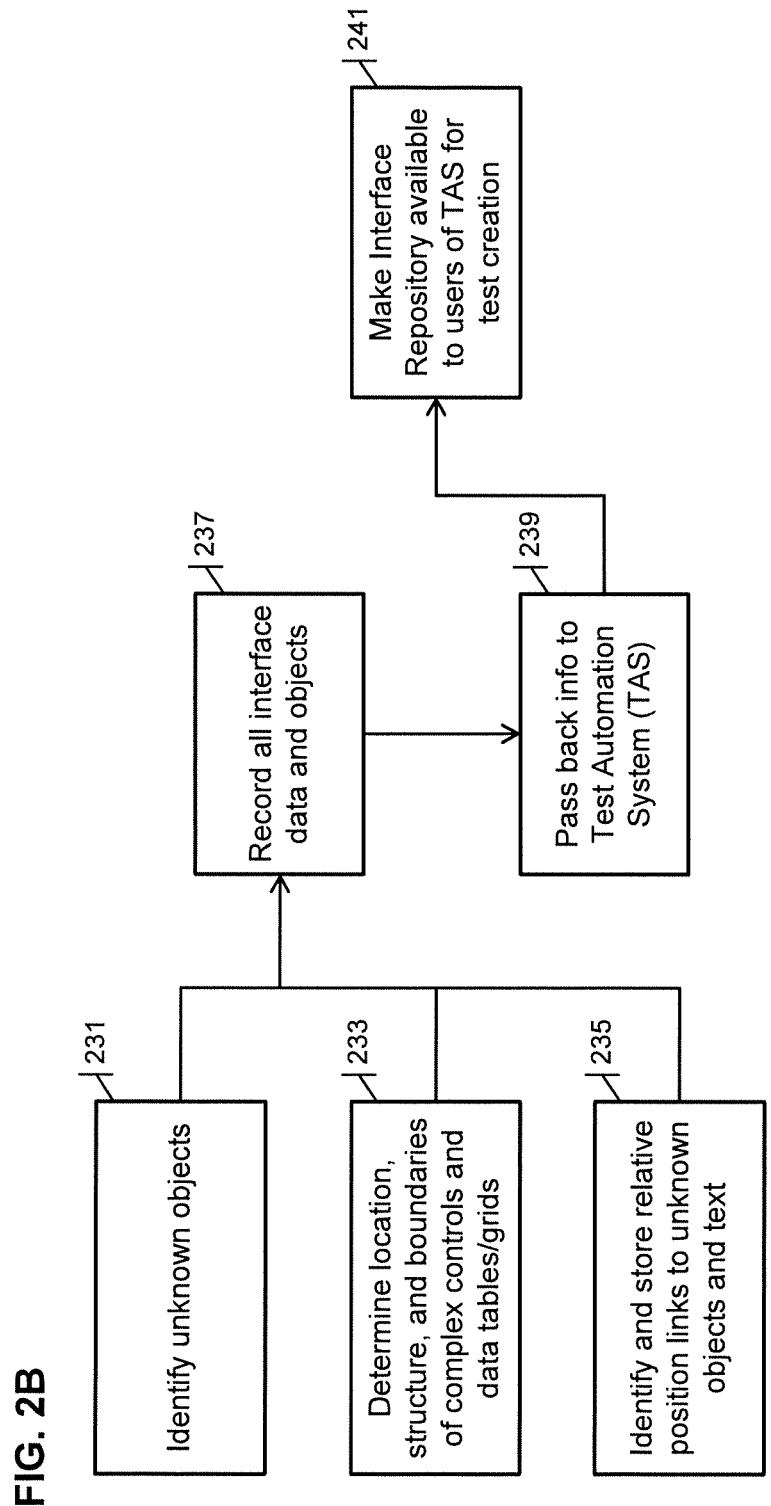

Further functioning of the automation tool 101 and its scanning and learning are detailed in FIG. 2B. As shown in FIG. 2B, the scanning and learning includes identifying all unknown objects, including icons, and user input objects where no logical names can be determined, and text on the GUI page in step 231. Step 231 may be substantially similar to step 203. Additionally, the relative position/location of each object or text is determined in step 233 and, based on the position/location information for all objects or text on the GUI page, the automation tool 101 determines the positional structure of the objects or text on the page. For example, the automation tool 101 determines whether objects or text are aligned horizontally or vertically with each other, whether objects or text are centered, right-justified, or left-justified on the page, whether objects or text are disposed according to a grid or table, or the like. The automation tool 101 further identifies boundaries of complex controls and data tables/grids. In step 235, the automation tool 101 determines whether certain objects or text are positioned relative to or according to the position of objects or text on the GUI page, and identifies and stores relative position links for such objects or text. A relative position link is an element's position in relation to other elements on the GUI page, such as to the right of, below, between two fields, at the intersection of any two elements on the interface, or the like. The relative position of one element (object or text) in relation to one or more elements on the page and is also used to determine if the elements are grouped such as with tables and grids or repeating dynamic element groupings on a GUI page. A relative position link identifies a location strategy for each object or text that is passed back to the automation system and is used to identify and select each particular element during execution of test cases.

In one example, the relative position link can be used to identify particular elements in illustrative Table A, shown below. The table includes checkboxes in each of the first three columns of the table, and each column has a different text header that appears above the columns and above the checkbox user input objects. In order to select these fields, each checkbox user input object would be given the logical name of the column header of the corresponding column, and would be identified in the interface repository for this GUI page with a relative position link such as 'check the checkbox for "Edit" to the left of the value "Product C" in the name column (or below 'name'). The relative position rules would find the "Product C" value, would then find the fields under "Edit," and would select the checkbox user input object in that immediate left position.

TABLE A

| Edit | View | Delete | Name |
|------|------|--------|------|
| ☐ | ☐ | ☐ | Product A |
| ☐ | ☐ | ☐ | Product B |
| ☒ | ☐ | ☐ | Product C |

In another example, in the illustrative GUI page of FIG. 3A, the automation tool may determine that the objects 301 and 307a-c are positioned relative to each other to be aligned horizontally with a specified spacing between each other, and that they are aligned to be positioned on a line directly below the text "Name*."

As the automation tool 101 identifies objects and text on the GUI page and determines their relative positions in steps 201-225 and 231-235, the automation tool 101 records all interface data and objects in the interface repository 110 in step 237. Once learning processing of the GUI page is complete, the automation tool 101 can pass the information stored in the repository 110 to a test automation system (TAS) in step 239 such that the information can be used to create and administer testing of the application system 109 in step 241.

Figure 2C:
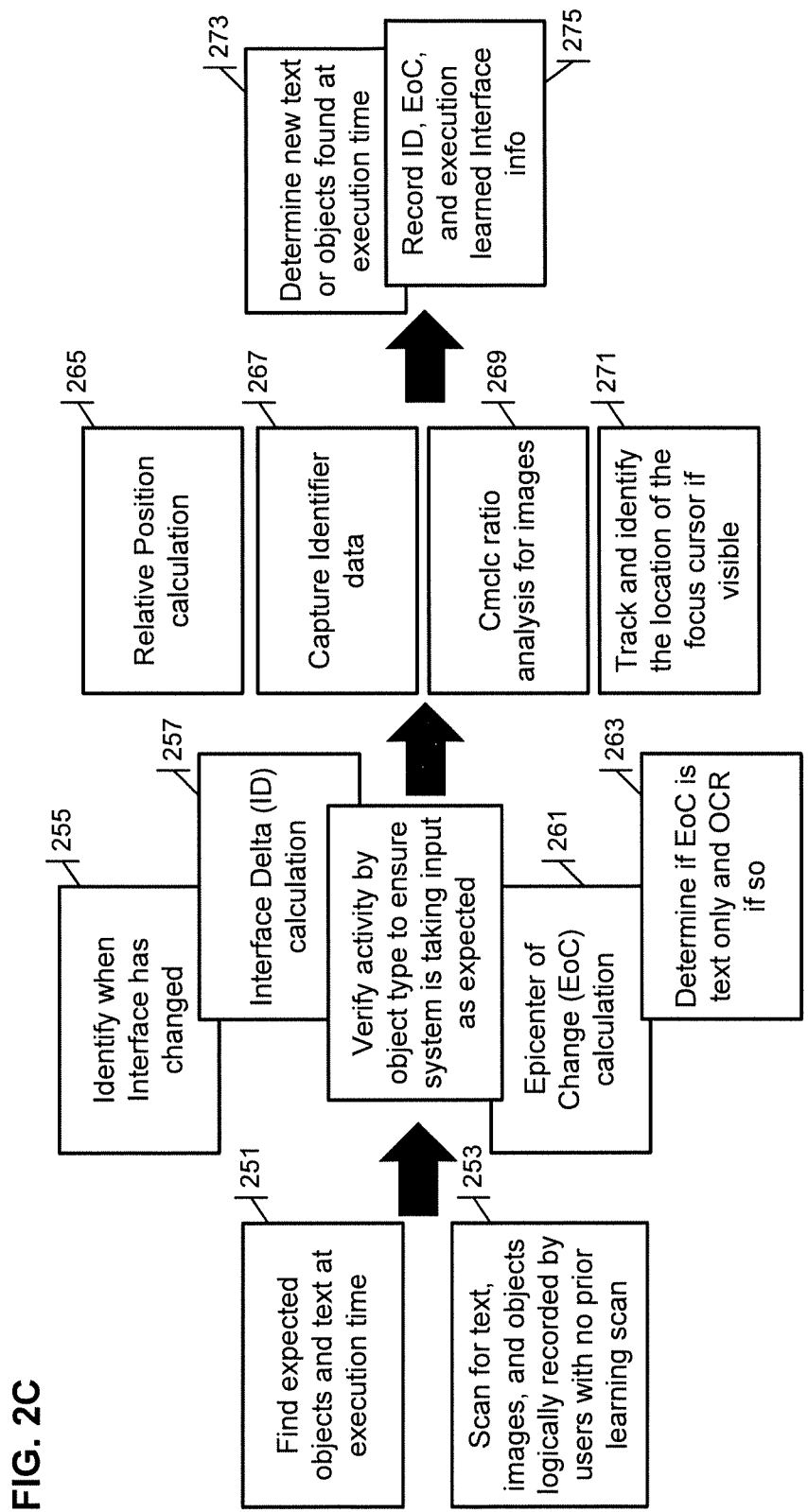

The analysis, scanning, and learning performed by the automation tool 101 is performed continuously on the application system under test 109 so as to scan and learn new GUI pages and/or changes occurring in GUI pages during execution of the application system 109. As such, the automation tool 101 can identify changes in the GUI page over time (e.g., changes occurring in response to a user selection, a user input, or the like) and can record and catalog each observed change into the interface repository 110. The diagram of FIG. 2C illustratively shows such operation.

In steps 251 and 253, the automation tool 101 finds expected objects and text at execution time of the application system 109 based on location strategy. It is possible to skip the learning process of an AUT and for a tester to manually create the expected OCR attached text of the fields or logical names of user input objects within the interface repository for the automation tool to interact with for the test execution. In cases where the GUI page was never supplied for learning, the automation tool 101 further scans for text, images, and objects logically recorded by users with no prior learning scan. Steps 251 and 253 may be similar to the scanning and learning detailed above in relation to steps 201-225 and 231-237.

Additionally, the automation tool 101 may perform verification on the identified objects to ensure that the application system 109 accepts the appropriate type of input for different object types (step 259). For example, the automation tool 101 may test a checkbox by attempting to click the checkbox; the tool may test a text field by ensuring that a label that was overlaid over the text field (e.g., at 301a in FIG. 3A) disappears when the text field is selected; or the like.

In another embodiment, the automation tool can be running independently and continuously to constantly look for peculiar or unexpected changes in an application system under test. This could be occurring separately from the test execution process. The automation tool can be used to look for error popup dialogs, or unexpected crashes, or error text appearing on the GUI page. This information can be passed back in the final report and require manual post-test execution analysis to determine if the unexpected event was a defect, known event, or unrelated. If the user determines that the GUI page contains new elements which should be made available for testing, then the elements are automatically added to the interface. If it is a known event or is something which should be ignored, then the time/event details is captured and this event is ignored in the post execution analysis and not prompted to the user on a future execution of this test.

As part of the scanning of the GUI page in steps 251 and 253, the automation tool 101 may perform one of several specialized functions. In step 255, for example, the automation tool 101 may determine when the GUI page's interface has changed, and may record the time at which a change is observed. In particular, the timing of the change may be used to determine whether the change occurred in response to any action by the automation tool 101, for example by determining whether the timing of the observed change was synchronized with an action of the automation tool 101 (e.g., a scrolling action, the entering of information into a field, the selection of a box or button, or the like). The timing may be synchronized if the change occurs concurrently with or shortly after the action being performed by the automation tool 101.

In step 257, the automation tool 101 calculates an interface delta (ID). The ID provides a method for the automation tool 101 to determine when the GUI has changed, and to recognize changes between a previous stored GUI image and a new GUI image. In some examples, the ID is determined by performing pixel analysis of changes to the interface view (screenshot, image, page, etc.), for example to identify changes having occurred after an action (e.g., a selection) was performed on a GUI page. The Interface Delta is represented by a matrix of coordinates which identify the portion of the GUI page which changed between before and after images. For example, an Interface Delta can be calculated to validate whether a test step was successful. The ID is a pixel analysis which shows coordinates of rectangles of all pixels which have changed between the two images. This would be ignored after a major change such as a step which scrolls the application or clicked to a new interface.

Figure 3C:
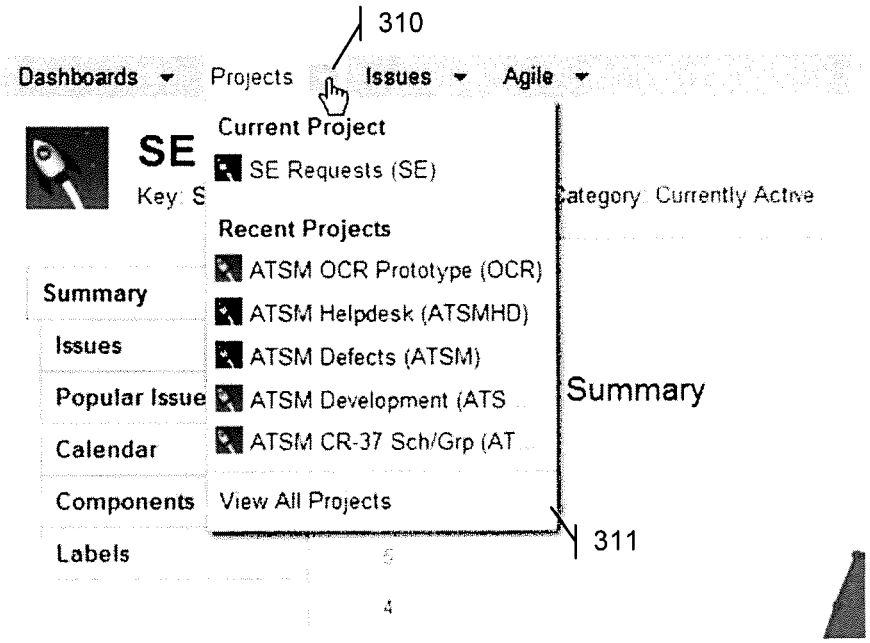

For example, in response to determining that a change in the interface has occurred in step 255 (e.g., in response to an action having been performed), the automation tool 101 may identify the changes in the GUI page that have occurred. The changes are referenced as the interface delta (ID). For example, the automation tool 101 may compare the current GUI page with the preceding GUI page to identify those portions of the page that have changed. In one embodiment, images of the current and preceding GUI pages may be subtracted from each other using pixel analysis, and non-zero portions of the subtracted image may be identified as the ID. In one illustrative example page shown in FIG. 3C, the automation tool 101 may identify that a change in the interface has occurred in response to the selection of the drop-down menu selector 310 (e.g., step 255), and may then identify the drop-down menu 311 that was presented in response to the menu selection as the ID (step 257). Once the ID is identified, the automation tool 101 may perform scanning and learning steps (e.g., steps 201-225 and 231-237) on the ID to identify objects newly presented on the GUI page. Hence, the ID enables the automation tool 101 to know when the GUI has changed and recognize the new GUI if it exists in the system by finding the logical name of new interfaces and performing pixel analysis of changes to the interface view (screenshot, image, page, etc.) after actions.

Figure 3G:
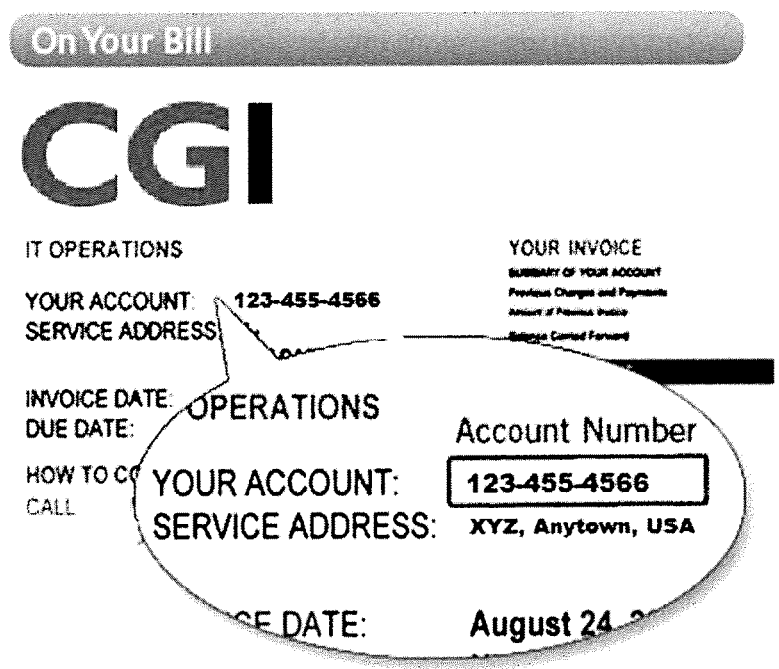
Figure 3D:
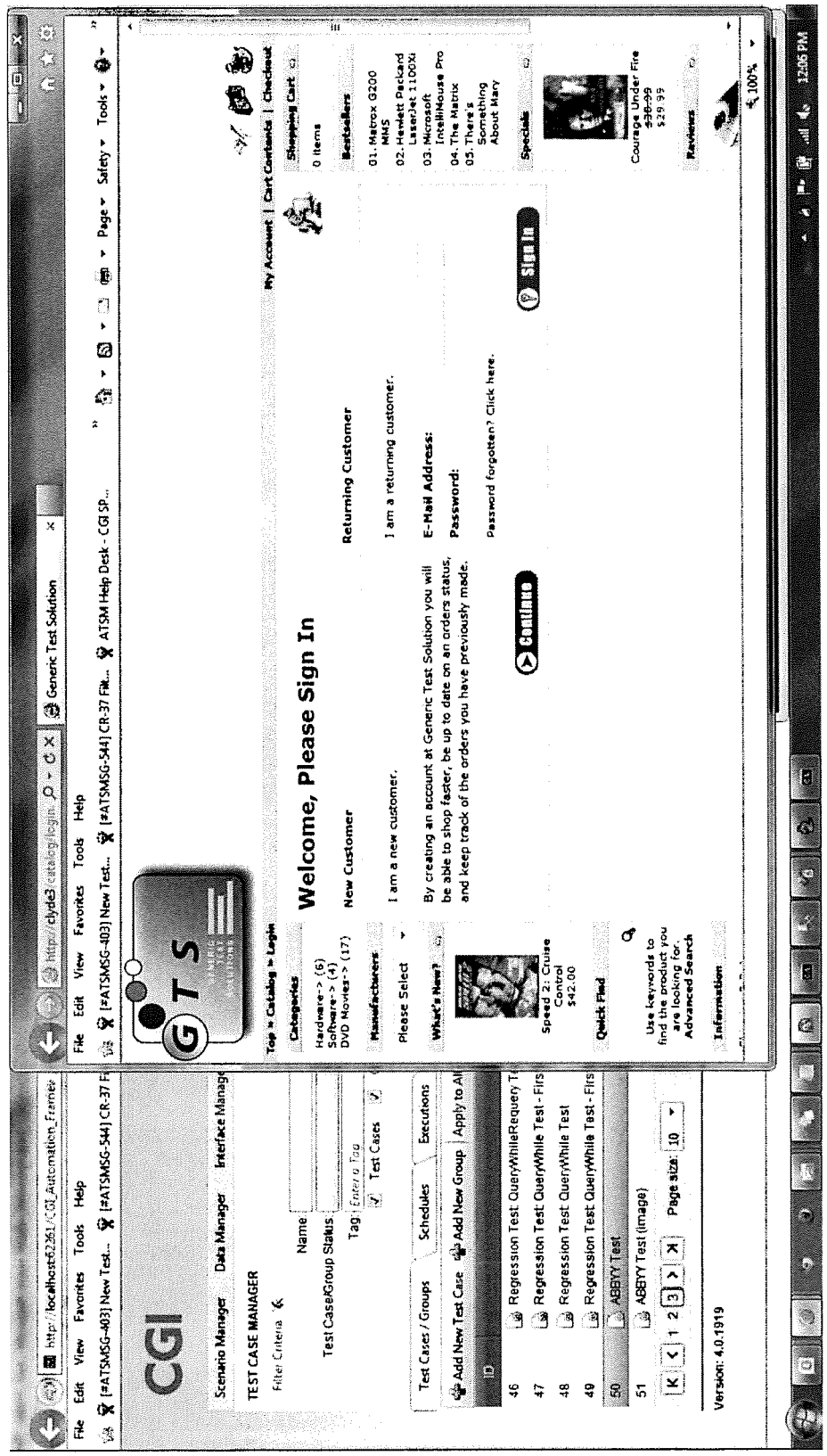

In some situations, the calculation of the ID may cause the automation tool 101 to focus on secondary portions of the GUI page. For example, the calculation of the ID may result in the identification of a portion of the GUI page including a banner advertisement, an animation (e.g., an animated hourglass icon), or other secondary content. In order to ensure that the automation tool 101 does not unnecessarily focus on such content of secondary importance, the automation tool 101 performs an epicenter of change (EoC) calculation in step 261. In one illustrative example shown in FIG. 3D, the automation tool 101 recognizes the "E-Mail Address" field and location in a GUI page as the true Epicenter of Change, despite changes having occurred in multiple other portions of the GUI page including in background of the page. In some examples, the EoC may be identified by the presence of particular text or objects, by the location on the page (e.g., the EoC is generally located in a central portion of a page), or the like. The EoC calculation uses a path algorithm such as the widely available A* algorithm that takes input of the prior step coordinates on the GUI page and determines the most likely next step coordinate area in the same direction of GUI interaction. For example, if a prior step in a test case caused text to be input into the E-mail Address text field in the page of FIG. 3D, the EoC calculation will identify the portion of the GUI page including the E-mail Address text field as the EoC. The automation tool 101 may then assume that a next step in the test case will be performed within the vicinity of the EoC. If an object outside the EoC is the intended target of the next step, then the test case may identify the appropriate target of the next step to be outside of the EoC using relative position.

Once the EoC is identified, the automation tool 101 can determine whether the EoC includes text only and, if so, the automation tool 101 can perform OCR on the text in step 263. In some examples, the ID or EoC may display error text or GUI validation messages such as those illustratively shown in FIG. 3K. In such situations, the automation tool captures and OCRs unexpected text, and determines whether the text was presented in other execution runs of the application system 109 by comparing the OCR text to text recognized in prior runs. The automation tool 101 may then flag the text as application feedback that may require presentation to a manual tester or other further analysis. Similarly, if an unknown or unexpected pop-up or error dialog is detected on the GUI page during test execution, the automation tool 101 can flag the pop-up for further analysis in a test execution report provided to a manual tester or other test administrator.

The ID and EoC calculations (steps 257 and 261) can be used during execution of a test of the application system 109 to identify a portion of the GUI page in which to perform an action specified in the test parameter database 111. For example, the calculations can be used on a GUI page including multiple "Submit" buttons to determine which "Submit" button should be activated. For this purpose, the automation tool 101 may identify the "Submit" button that is located within or proximate to the ID or EoC. In particular, the tool may also use path analysis of prior steps in a test case to identify the logical location at which a next step will be performed, for example.

The ID and EoC calculations can further be used to identify the changes which occur after actions are performed on the application system 109 being tested, where those changes have occurred, the degree or size of the change from the prior GUI capture, and to filter out any minor, background, unrelated, inconsistent, scrolling, or otherwise non-relevant changes which occur in the background outside of the application system 109 being tested. The purpose of the analysis is to understand what areas of the application 109 are taking interaction and which dynamic areas of the application 109 or its background can be ignored. This allows test cases to be resilient when identical anchors are found in the test environment but the desire is to interact with only a specific one. One example may be that a Submit button is found in 5 locations on an interface and this location may change and even new Submit buttons may appear in areas of the interface such as banners, navigation frames, and advertisements; but the Submit button desired to be clicked will only be the one located in the portion of the interface where a user is currently taking actions. By identifying the EoC and directing new actions logically to areas near the EoC, the automation tool 101 can automatically determine the portion of the GUI page in which to perform actions in such situations.

During the execution of testing of the application system 109, the automation tool 101 continuously performs relative position calculation (step 265) to determine the position of objects or text, similarly to the location determinations described in steps 233 and 235 above. Relative position calculation can use path analysis to determine which element fall in the path supplied. In particular, the relative position calculation can be performed to determine whether text or objects on the GUI page are positioned relative to each other. For example, the relative position calculation may be used to identify and make available relative position links that can be used to identify and interact with objects, text, and other GUI elements from the GUI page with no adjacent logical text to identify the elements, such as images or text that appears on the interface with no associated element or label text. Data within tables and grids can also be identified with relative position. More generally, the relative position calculation is used to locate elements which do not have another simple access method. Hence, user interface objects that have associated text mapped thereto can be skipped over for relative position searches, and best path analysis may be performed to locate the desired elements using relative position calculations.

Figure 3E:
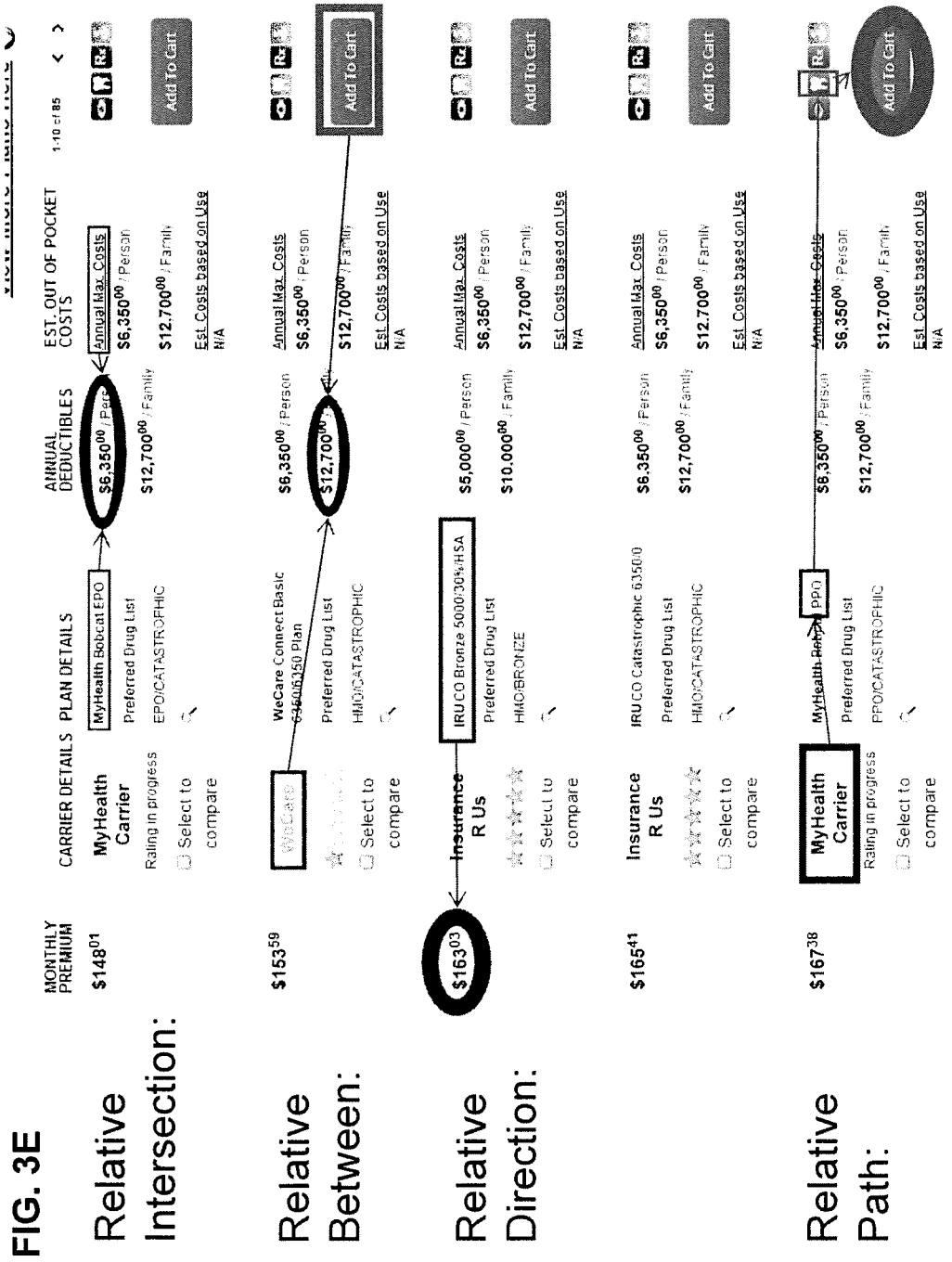

As shown in the examples of FIG. 3E, the position of an object or text can be defined relative to other objects as being at a relative intersection of two objects (e.g., the text "$6,350$^{00}$/Person" is located at the relative intersection of "MyHealth Bobcat EPO" and "Annual Max. Costs"), at a relative location between two objects that are not vertically or horizontally aligned (e.g., the text "$12,700$^{00}$/Family" is located at the relative intersection of "WeCare" and "Add to Cart"), in a relative direction from a point on the interface even if the direction is not directly in a straight line (e.g., the text "$163$^{03}$" is located to the left relative to "IRU CO Bronze 5000/30%/HSA"), or according to a relative path or other sequence of multiple relative location markers (e.g., the button "Add to Cart" is located below the tooth icon that is horizontally aligned to the right of the "PPO" text that is itself aligned to the right of the "My Health Carrier" icon).

Figure 3F:
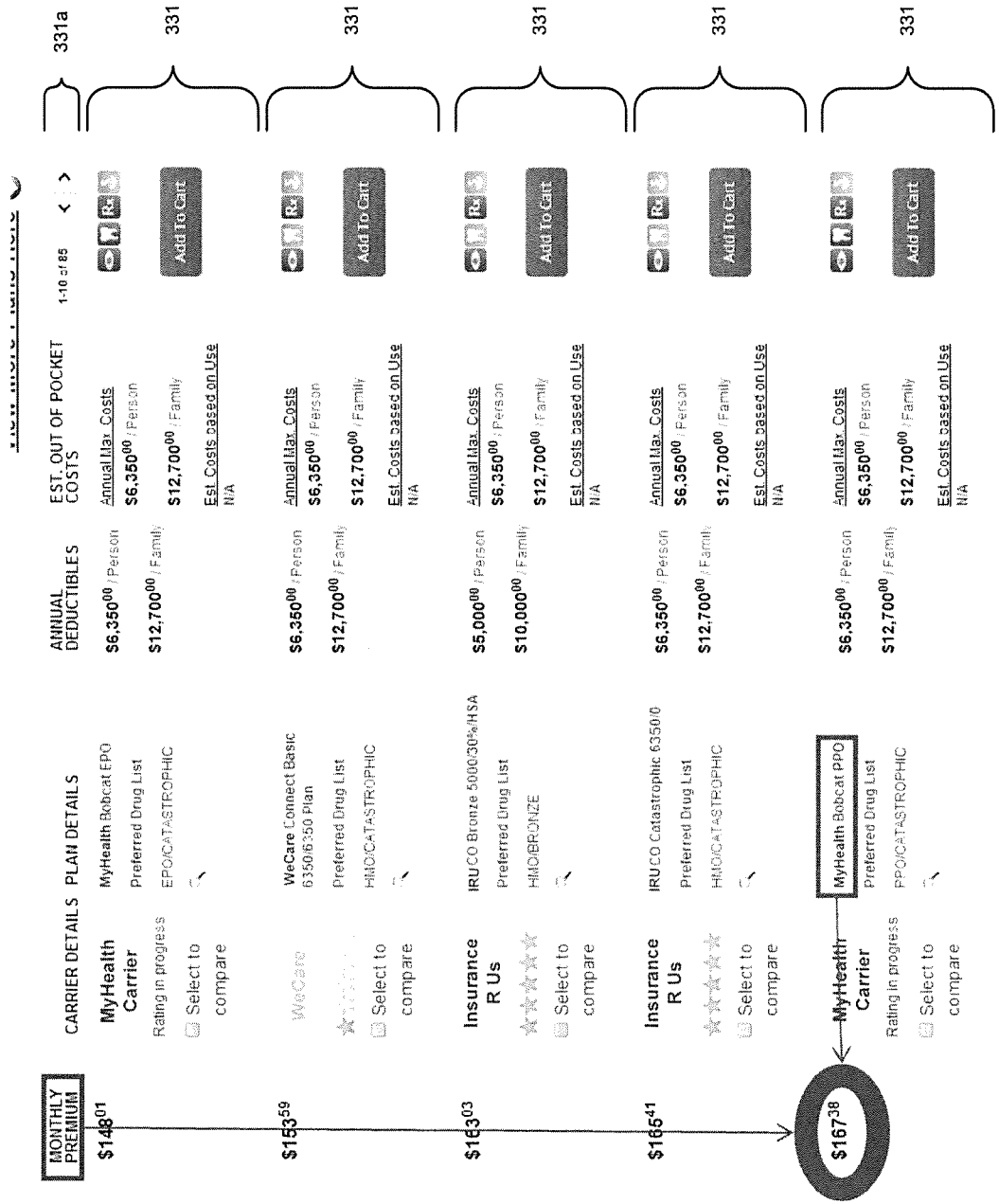

The relative position of step 265 can further be used to interpret table or array data, as illustratively shown in FIG. 3F. In this regard, the automation tool 101 can automatically identify a table or array layout template on the GUI page, and associate column or row headers with text and objects disposed within the table or array layout. In the example of FIG. 3F, for instance, the automation tool 101 identifies the table layout including the different web table rows 331 including a header row 331*a*. The automation tool 101 further recognizes the column headers including the "Monthly Premium" and "Plan Details" column headers, and identifies the "$167$^{38}$" label as being the "Monthly Premium" corresponding to the plan "MyHealth Bobcat PPO" plan since the two entries are located in a same row of the table. Specifically, the automation tool 101 solves for the "Monthly Premium" value (red circle) using the two red rectangle text locations so as to obtain the text value below "Monthly Premium" and to the left of "MyHealth Bobcat PPO".

Using the relative position methods detailed above, the automation tool 101 can effectively learn the interface with repeated text, images, objects, or elements which appear on a GUI page and identify tables, trees, grids, or dynamic repeated sets of business objects such as multiple address fields with identical logical names and labels on the edit boxes for an interface. By learning these complex objects, the system can understand the structure of an interface and of the complex controls and data presentation in order to interact with the correct associated text, images, and objects. As an example, the table of FIG. 3F includes a multiline static text field with buttons to edit the row on the far right side. If a user requests to click the "Add to Cart" button to the right of a particular word or text, the system will determine the correct "Add to Cart" button even if all the other "Add to Cart" buttons are located to the right of the word and some are even closer to the anchor word than the one associated to the correct row. This capability is achieved based on the automation tool 101 learning the structure of the table in the analysis phase and knowing what constitutes a row 331 and a column in the table and knowing that the correct "Add to Cart" button for each row appears in the bottom right position prior to the next row.

Additionally, in step 267, the automation tool 101 can also capture identifier data in association with the data on the user input objects. Identifier data is static text or text that appears within a user input object or other typically important field and stores an account number, invoice number, customer number, or the like. The identified data is captured and stored in the interface repository 110 in order to be later used in test cases. As illustratively shown in FIG. 3G, the automation tool 101 recognizes account numbers, customer identifiers (IDs), and other valuable/important information generated by the application system 109 and saves the identified numbers and identifiers in the interface repository when they are presented in a GUI page during execution of a test case. The automation tool 101 can then access the saved identifiers, for example for use in later testing or later runs of a test on the application system 109. The account numbers and customer identifiers (IDs) can be identified based on associated text labels that the automation tool 101 recognizes on the GUI page, such as the labels "Your Account", "Account ID", "User ID", or the like.

Figure 3I:
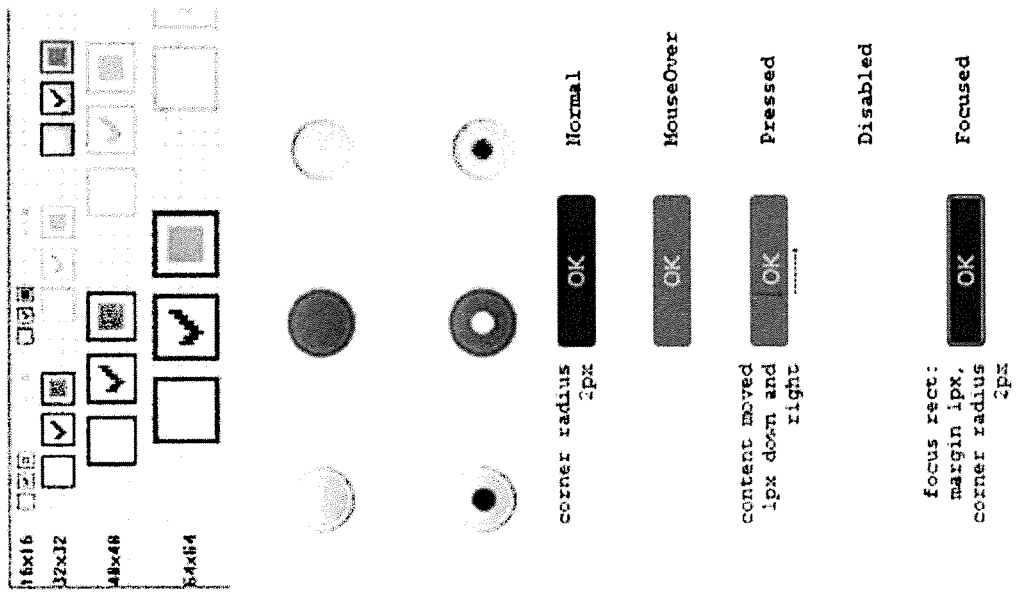
Figure 3H:
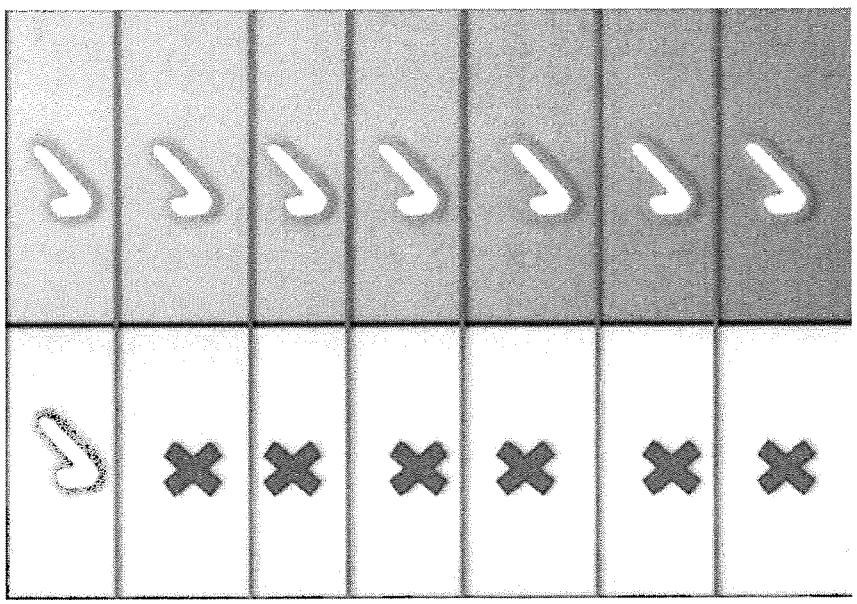

As part of the scanning and learning to identify objects and text on the GUI page, the automation tool 101 can perform pattern or image matching to identify particular objects and text. For example, the automation tool 101 may perform image matching to identify a radio button and determine whether the radio button is selected or unselected. Examples of various images (e.g., checked or unchecked checkboxes, selected or unselected radio buttons, "Ok" buttons, or the like) that may be used for pattern matching or image analysis are shown in FIG. 3I. In general, pattern and image matching can be hindered when objects or images are disposed on a background having a gradient in color. To improve the automation tool's ability to perform pattern or image matching, the automation tool 101 is configured in step 269 to learn and recognized repeated images, objects, or elements even if the colors of the objects or of their backgrounds are slightly different or the images have minor pixel differences. As an example, in a table with Edit buttons on the right side which have a slight gradient in color from one row to the next, a simple pattern matching may fail because the Edit buttons are not identical images even though they are logically repeated objects. To provide improved matching performance, the automation tool 101 performs an analysis of color hue using a method known as CMCLC ratio. In an illustrative example shown in FIG. 3H, the automation tool 101 is capable of recognizing the checks in the right column despite the changes in color of the background. In particular, the automation tool 101 knows that each row is checked even though the background in the field has a slight gradient in color which would cause simple image matching to fail. As such, slight differences in coloring of image matches is ignored based on the CMCLC ratio, thus allowing the system to detect functionality with similar images even with slight visual aesthetic differences.

The automation tool 101 can further track and identify the location of a focus cursor, if visible, in step 271. For example, upon being presented the GUI page shown in FIG. 3D, the automation tool can identify that the cursor has automatically been placed in the text field box located to the right of the "E-Mail Address:" label upon loading of the GUI page. Upon identifying that the cursor has been auto-focused on the text field box, the automation tool 101 records in the interface repository 110 the object on/in which the cursor was autofocused upon loading of the GUI page. The automation tool 101 can further identify the EoC of the page based on the location as which the cursor was focused.

As noted, the automation tool 101 performs scanning and learning of the GUI pages presented by the application system 109 during each step of test case execution of the application system 109. The automation tool 101 thereby determines all new text or objects learned at execution time (step 273). The automation tool records the interface delta (ID), epicenter of change (EoC), and execution learned interface information in the interface repository 110 during execution time (step 275).

Figure 3J:
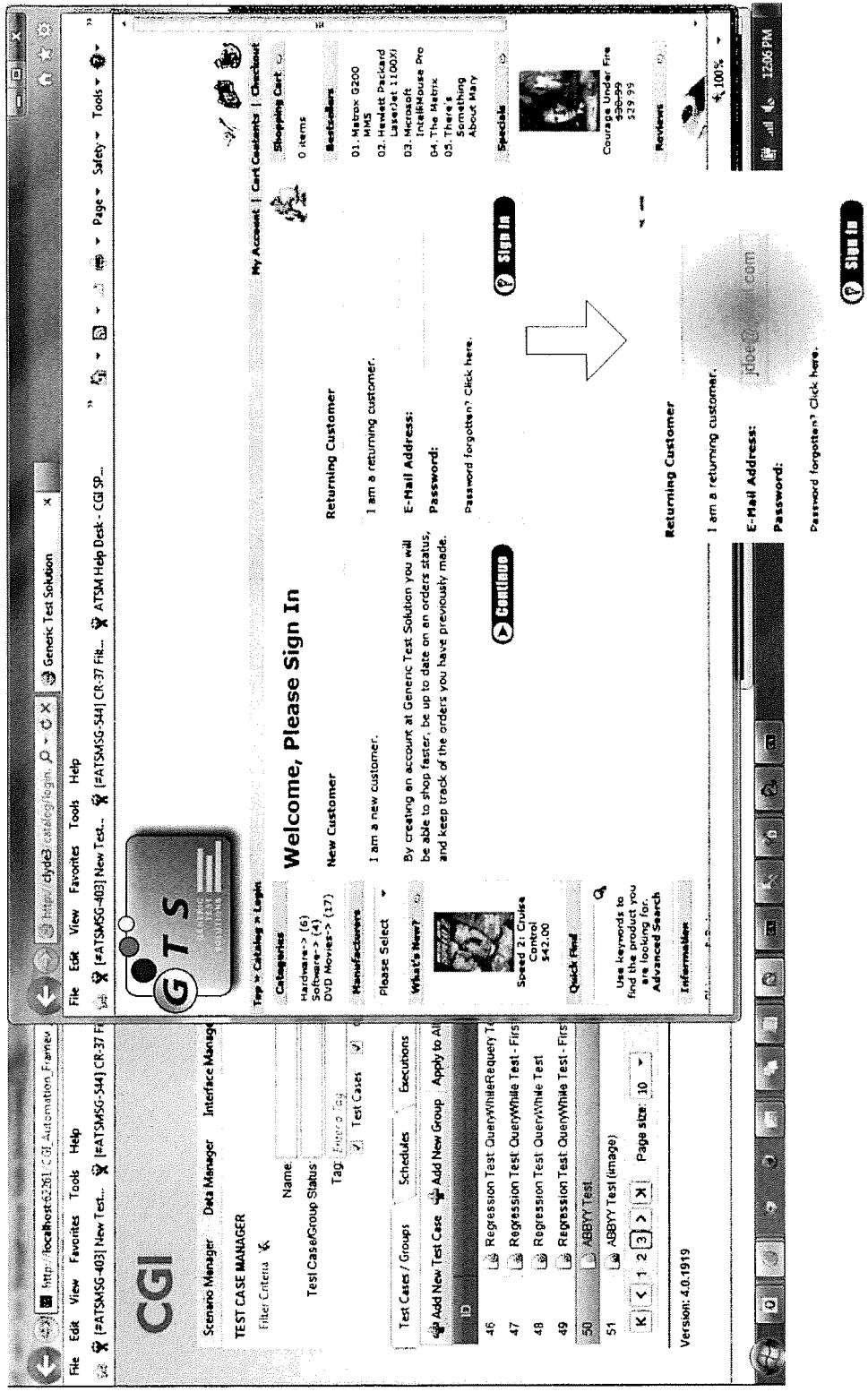
Figure 3K:
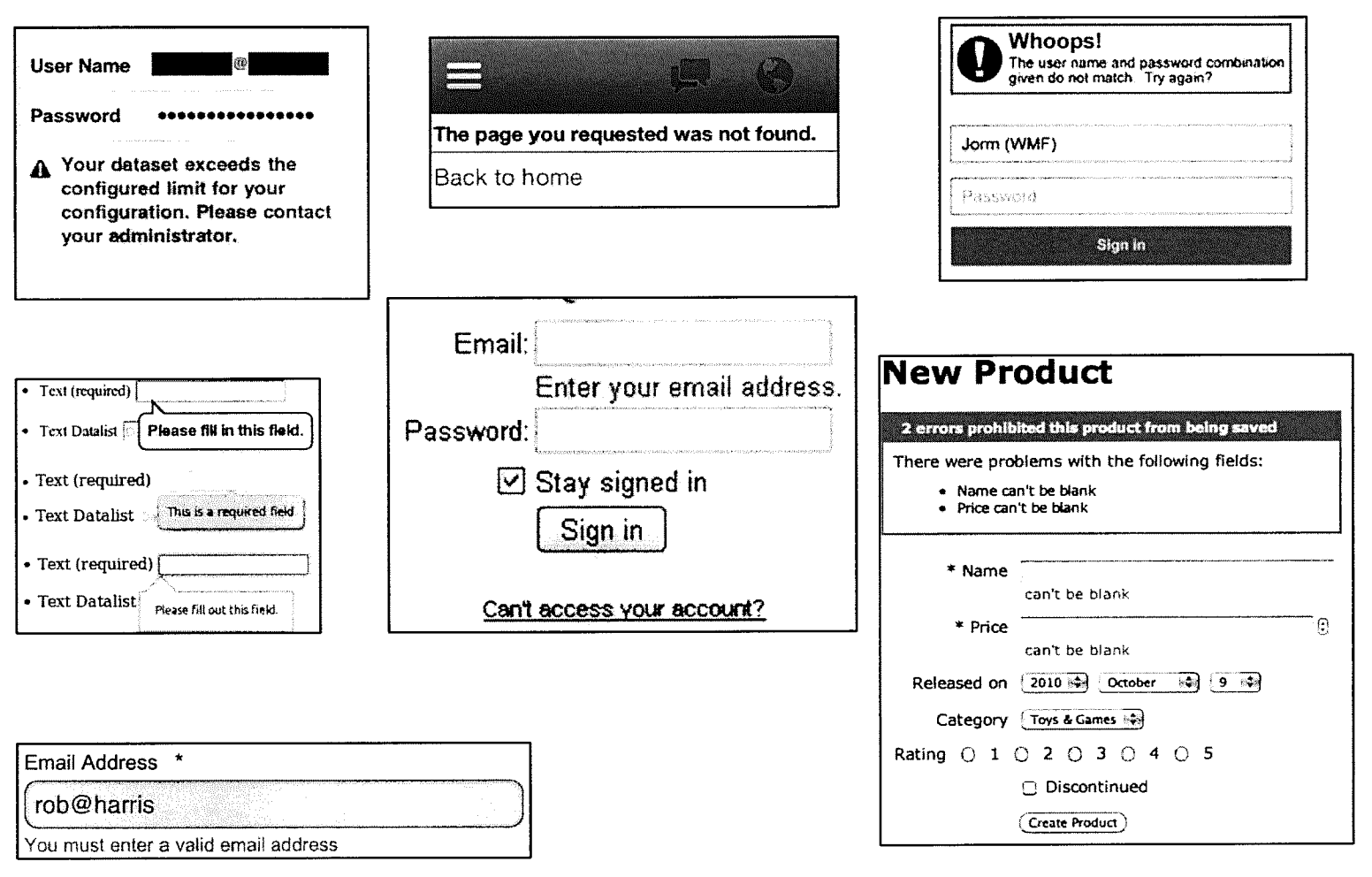

Further, as shown in FIG. 3J, the automation tool 101 monitors the GUI page when actions are taken to ensure that the correct action is taken. As such, in response to taking an action to type "jdoe@gmail.com" into a text field associated with the "E-Mail Address:" text, the automation tool 101 monitors the GUI page to ensure that the appropriate text is entered at the appropriate location on the GUI page, as illustratively shown in FIG. 3J. The automation tool 101 thereby captures changes at all points of test execution in order to verify that after an action is taken, the application under test 109 received the action and the change expected from the action has occurred.

Figure 2D:
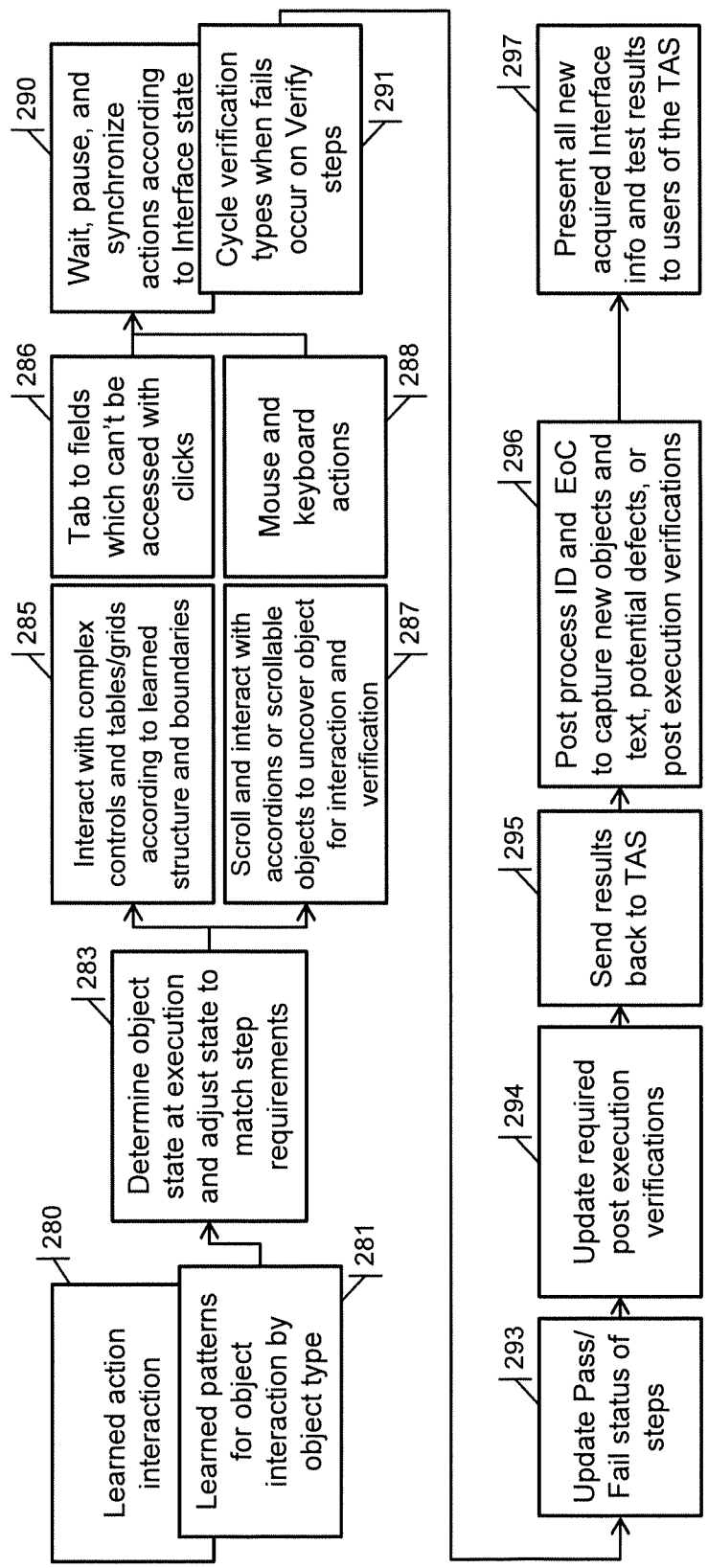

The automation tool 101 is further configured for learned action interaction, as detailed in the flow diagram of FIG. 2D. Learned action interaction is used by the automation tool 101 to interact with complex GUI objects, both during scanning and learning of a GUI page and during execution of a test involving the GUI page. Specifically, the learned action interaction enables the automation tool 101 to identify a complex GUI object, to scan and learn the object type capability information of the complex GUI object, and to interact with the GUI object so as to access all other interfaces of the complex GUI object and scan and learn the other interfaces. During execution, the automation tool 101 can then access an appropriate interface of the GUI object as part of performing an action on the complex GUI object.

For example, in the case of a list or combo box, the automation tool 101 scans and learns the default interface of the list or combo box. As part of scanning the default interface, the automation tool 101 identifies the object as a list or combo box and, in response to the identification, interacts with the list or combo box so as to expand the list or combo box. The automation tool 101 then scans and learns the options presented in the expanded list or combo box, and iteratively scrolls down though the list or combo box so as to scan and learn all options presented in the list or combo box.

In another example, in the case of an accordion menu, the automation tool 101 scans and learns the default interface of the accordion menu and identifies the object as an accordion menu. In response to the identification, the automation tool 101 interacts with the accordion menu so as to expand each item, label, or thumbnail of the accordion menu and scan and learn the content presented in the expanded item, label, or thumbnail.

As shown in FIG. 2D, learned action interaction begins in steps 280 and 281. The learned patterns of interaction with GUI objects are defined by object type, such that different learned patterns are associated with different object types. As such, different learned action interaction patterns can be associated with a list or combo box and an accordion menu. In addition to identifying the type of object on the GUI page, the automation tool 101 determines the state of the object at execution and adjusts state to match step requirements in step 283. For example, the automation tool 101 may determine whether a list or combo box is already expanded, whether a selection (e.g., a default selection) has already been made, whether an accordion item is expanded, or the like. The automation tool 101 then interacts with the object in steps 285-288. In step 285, the automation tool 101 interacts with complex controls and tables/grids according to learned structure and boundaries; in step 286, the automation tool 101 tabs to fields which cannot be accessed with clicks or selections; in step 287, the automation tool 101 scrolls and interacts with accordions or scrollable objects to uncover hidden portions of the object for interaction and verification. In each of the steps, the automation tool 101 performs mouse and keyboard actions (step 288) to access various parts, menus, and displays of the complex GUI objects.

During interactions with the GUI objects, the automation tool 101 is designed/coded to wait and pause when necessary so as to synchronize actions according to interface state (step 290). For example, the automation tool 101 may pause long enough to ensure that the GUI page is fully loaded and refreshed, to ensure that an interaction with the GUI page has been registered with the application system 109, and that the application system 109 has had sufficient time to respond to the interaction (e.g., by showing a list of options in an expanded list or combo box, by scrolling through a GUI page in accordance with a scroll action, or the like). The automation tool 101 further performs verification types during interactions, and may cycle through interactions if a failure is detected (step 291). In one example shown in FIG. 3J, the automation tool 101 may perform verification that the text "jdoe@gmail.com" was properly entered in a text field box in response to an action of the automation tool 101 by scanning and learning the GUI page after the action is performed. If a failure is detected (e.g., the incorrect text was entered), the automation tool may cycle through the action steps to ensure that the action is performed.

While performing each step of the learned action interaction, the automation tool 101 can thus perform an action (e.g., in steps 285-288) and perform verification that the step was properly executed (e.g., steps 290-291). If the step is determined to have been properly executed, the automation tool updates the Pass/Fail status of the step to a pass (step 293). If a step (or set of steps/actions) is determined not to have been properly executed, the automation tool 101 repeats the step (or set of steps/actions) and, upon repeated failure, updates the Pass/Fail status of the step to a fail. The automation tool 101 then updates required post execution verifications in step 294, and if the steps were performed during a test execution, the automation tool 101 sends results back to the test automation system (TAS) in step 295.

As part of performing the learned action interaction, the automation tool 101 uses interface delta (ID) and epicenter of change (EoC) calculations to capture new objects and text presented in response to interactions, to identify potential defects, or to perform post execution verifications (step 296).

Once the learned action interactions are completed during a scan and learn procedure, the automation tool 101 can present all new acquired interface information and test results to users of the TAS for use in designing and executing tests of the application system 109. Further, the automation tool 101 can access the acquired GUI objects during execution of a test of the application system 109, including GUI objects and text that are hidden within a complex GUI object, so as to interact with the GUI objects during the execution of the test.

The scanning and learning of GUI pages of the interface of the application system 109 by the automation tool 101 enables the automation tool to automatically populate the interface repository 110. Once populated, the interface repository 110 stores information on each GUI page of the application system 109, including detailed information regarding each text and object on each GUI page. The automation tool 101 can then be used to create customized test cases for interacting with the application system 109, and/or the automation tool 101 can automatically create test cases. The test cases are ordered sequences of test steps or actions that the automation tool 101 should take while interacting with the application system 109, including ordered sequences detailing data values to enter in user input object fields, selections to make on checkboxes or list boxes, buttons to press, files to upload or download, etc. The automation tool 101 is configured to run through the test cases, and to save the resulting data (e.g., images of the resulting GUI pages and of the OCR text retrieved from the GUI pages) in a test case output data database 115.

Figure 4A:
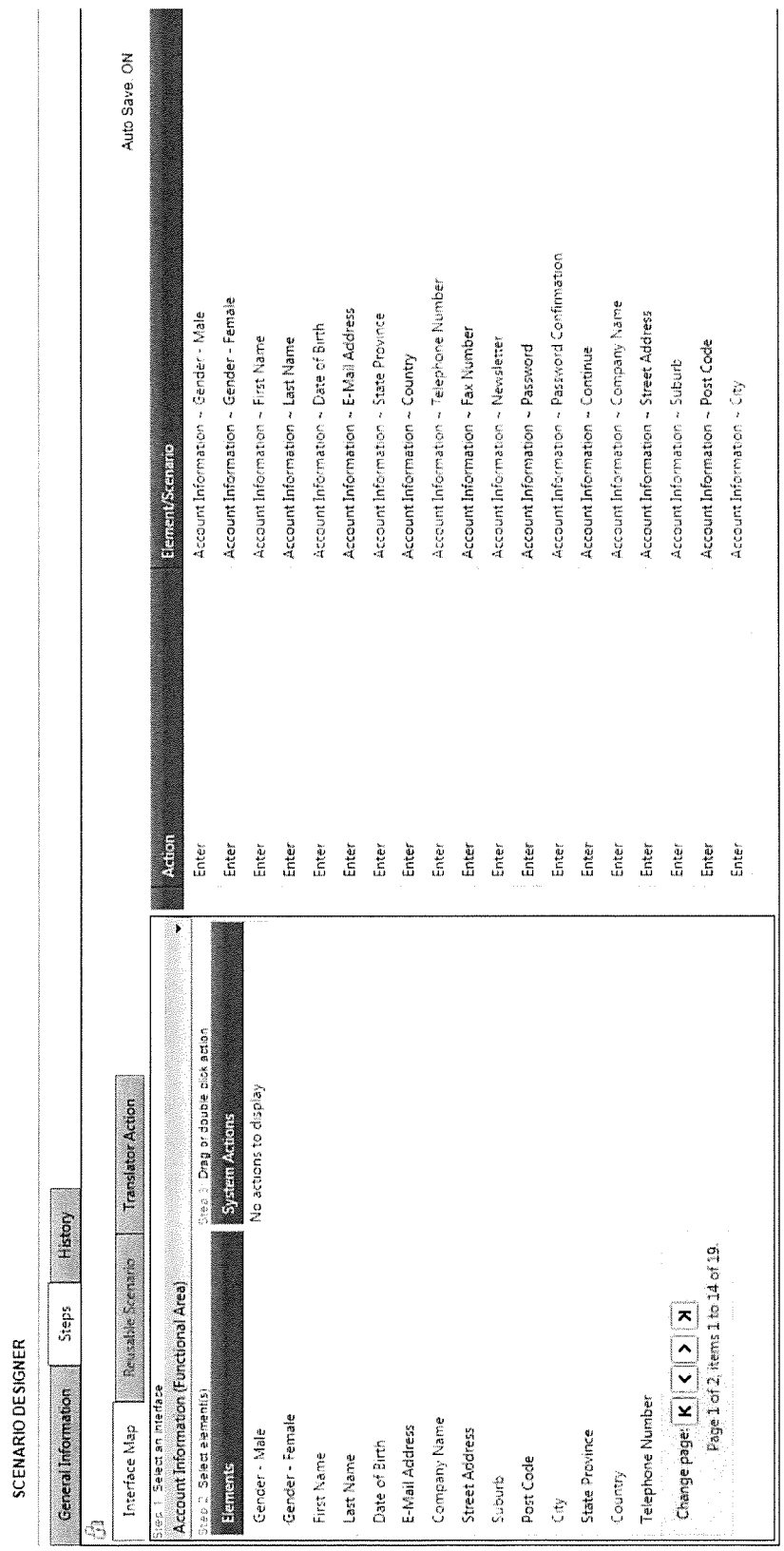

FIGS. 4A-4E are screenshots of the automation tool 101 when used in a mode to create/edit a test case for an application system 109. In particular, FIG. 4A shows a screenshot of the automation tool 101 being used to create a test case for interacting with the GUI page shown in FIGS. 3A and 3B. As previously discussed in relation to FIG. 3B, the automation tool 101 when operating in the scanning and learning mode populates the interface repository 110 with information on all objects and text found on the GUI page. The left-hand section of FIG. 3B shows an interface which includes the list of all objects identified in the "Create Account—Individual & Families" section of the GUI page. Each object is stored in the repository 110 with detailed information on the object, including information on the GUI page and portion of the GUI page in which the object is located. In particular, the repository 110 stores for each object the object type, the OCR text associated with the object, and the relative position of the object with respect to the OCR text (e.g., overlapping, above, below, or the like). When used in the test creation/editing mode, the automation tool 101 may present to a user menu options such as those shown in FIG. 4A. In a left-hand portion of the interface, the automation tool 101 provides a list of all objects or elements that were found on the GUI page of the application system 109, and whose information was stored in the interface repository 110. The list of all objects or elements found on the GUI page is provided to enable the creation or editing of test scenarios including actions to be performed on the objects or elements. As such, in a right-hand portion of the interface, a user can create an ordered sequence of actions to be performed (see "Action" column), and identify the interface element on which the action should be performed. Specifically, the user selects the interface element and drags and drops the element in the order desired for the test scenario. Once the user has finished creating the test scenario, the test scenario is stored in the test parameter database 111. When executing the test cases with are created with these test scenarios, the automation tool 101 searches for each element having an associated action on the GUI page, and performs the action associated with the element as specified in the test cases. In some examples, the interface also allows a user to create logical elements and data for test cases for application systems under test which are unavailable or have not yet been encountered for learning by the automation tool.

Each test case includes a sequence of actions to be performed on GUI pages of the application system 109. Each test case is associated with one or more test case datasets 114 stored by the automation tool 101 and including data for use when executing the test case—including text to insert or type into the text fields identified in the test case, selection to make in radio boxes and list or combo boxes identified in the test case, and the like. FIG. 4B shows a data manager that is used to generate various datasets for association with different test cases. Each row in the data manager corresponds to a dataset storing data for use in a test case. FIG. 4C shows a screenshot of the data manager showing one particular "Account Information" dataset for use with the test case created/edited in FIG. 4A. As shown in FIG. 4C, the dataset includes data values for use in multiple different executions of the test case. Specifically, each row of the dataset includes a set of values for use in one execution of the test case, and each column of the dataset includes values to be entered into a particular object/element of the interface of the application system 109. For example, column "A" indicates whether the radio button "Gender—Male" should be selected in each different dataset; row "3" includes values to be entered in one execution of the test case, including values to ensure that the radio button "Gender—Male" is selected/clicked and a first name "Bill" is entered in the "First Name" text field. Blank values indicate that no action should be taken with respect to a particular object/element (of the associated column) in a test dataset.

As shown in FIG. 4C, a test dataset can include multiple rows each including a different set of values to be used in the execution of a test case. Thus, execution of the test case based on the test dataset will result in the test case being executed multiple times such that each set of values can be tested. As an example, a test dataset can be stored in a test data matrix in which columns correspond to the user input objects on the GUI page and in which different rows correspond to different test conditions or different types of actual test data that can be entered on the GUI page. Each cell of the matrix thus stores an input value corresponding to a user input object to be used in executing a test condition corresponding to the particular row of the cell. A dataset is automatically created for every GUI page by the automation tool. The automation tool maintains the columns of this dataset when changes occur in the interface repository representation of the GUI page.

Figure 4D:
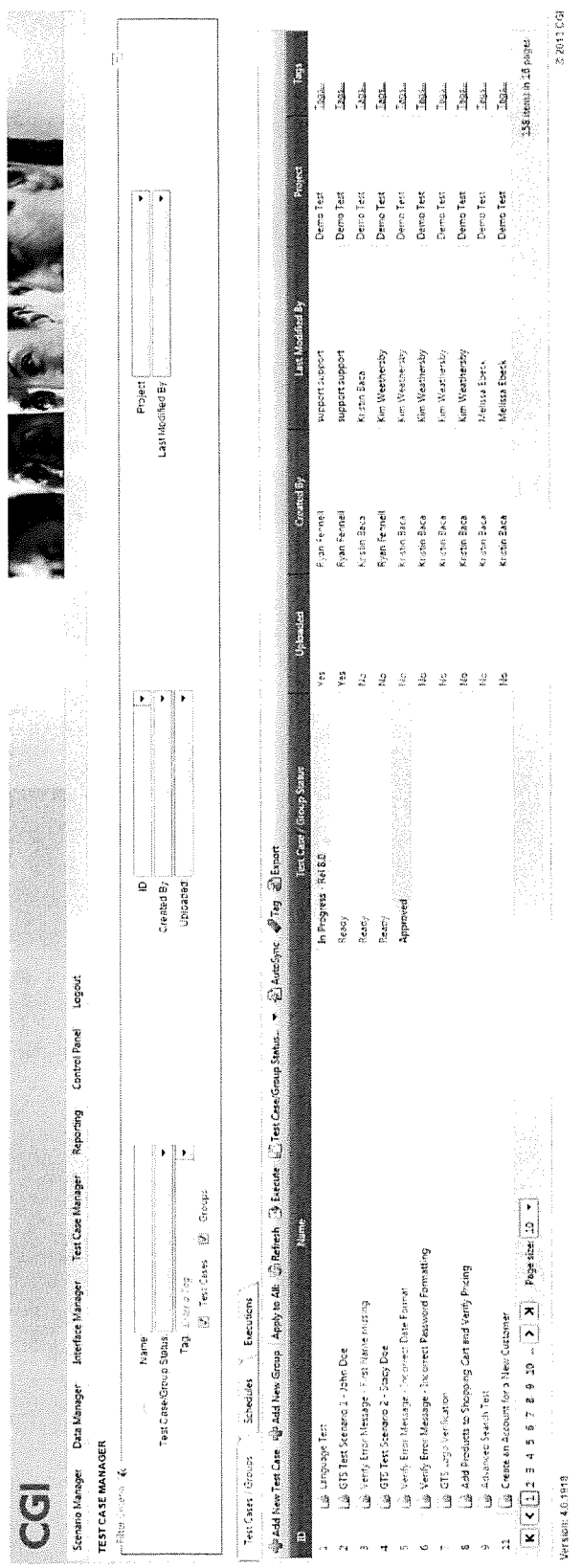

FIG. 4D shows a screenshot of the test case manager that forms part of the automation tool 101. The test case manager enables users of the automation tool create, review, and edit test cases. As shown, for example, a test case with ID=3 ("Verify Error Message—First Name missing") may be associated with the dataset values shown in line 5 of the table of FIG. 4C, such that executing of the test case with ID=3 will cause the test case shown in FIG. 4A to be executed using the dataset values shown in line 5 of the table of FIG. 4C.

Figure 4E:
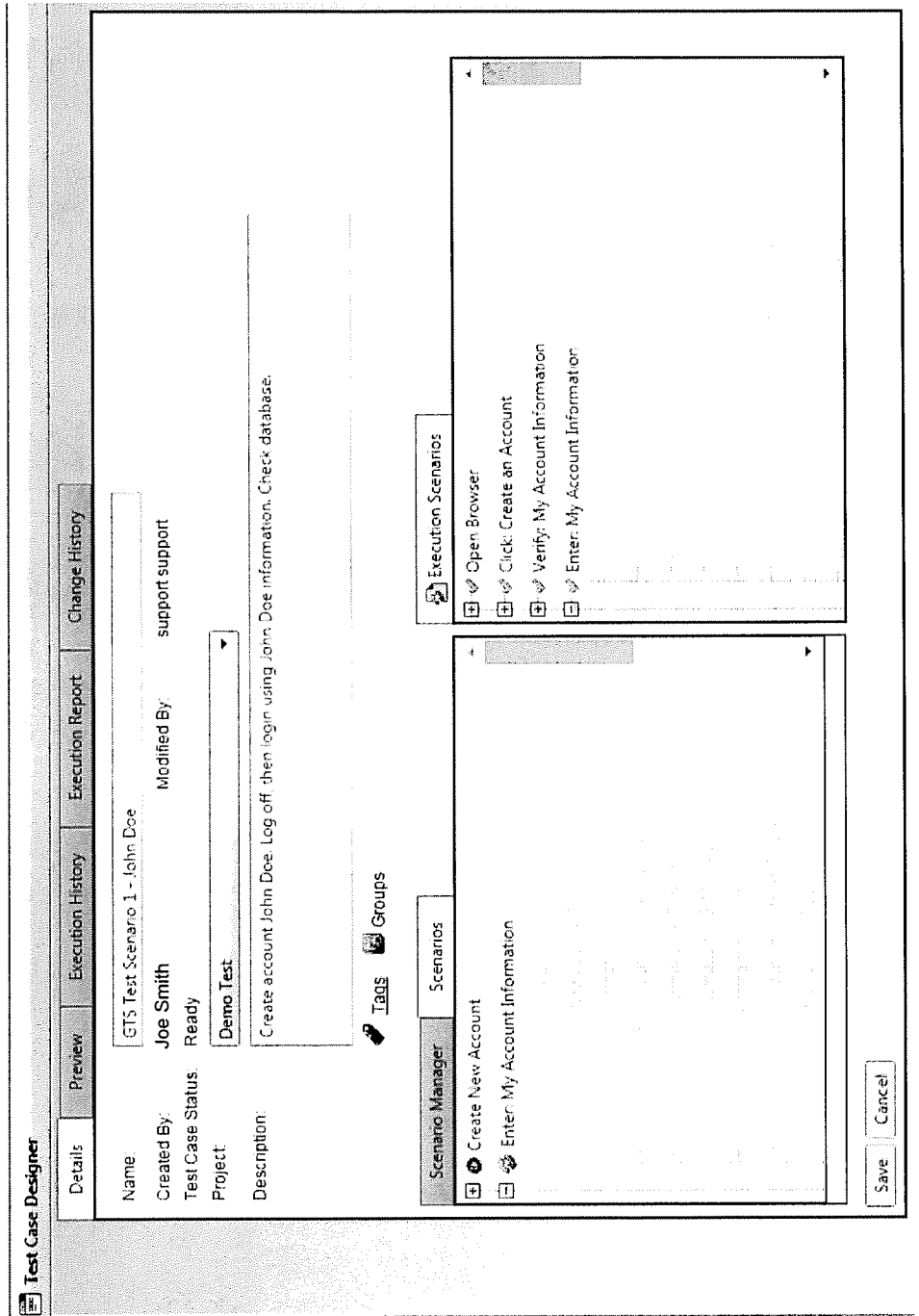

In order to create test cases, users access an interface of the automation tool 101 such as that shown in FIG. 4E. The interface of FIG. 4E shows available test scenarios for test steps on the left, and the test case flow as created by the user on the right. The user can drag and drop scenarios, then associate data. The scenario details are expanded on the left to show in detail the steps involved in executing the scenario. As shown, the execution can include verification steps (e.g., "Verify: My Account Information") as well as action steps (e.g., "Enter: My Account Information").

The automation tool 101 can include additional services relating to the execution of test cases on an application system 109, such as advanced scheduling and load balancing services. In one example, a "first available" option provides that a test case will be executed on the next available machine/computer/server; alternatively, the user can select a specific machine/computer/server to execute a test case. The automation tool 101 can also execute test cases on a fixed schedule, a recurring schedule, for a specified number of iterations (or repeated continually for a given time period), or the like.

Figure 5A:
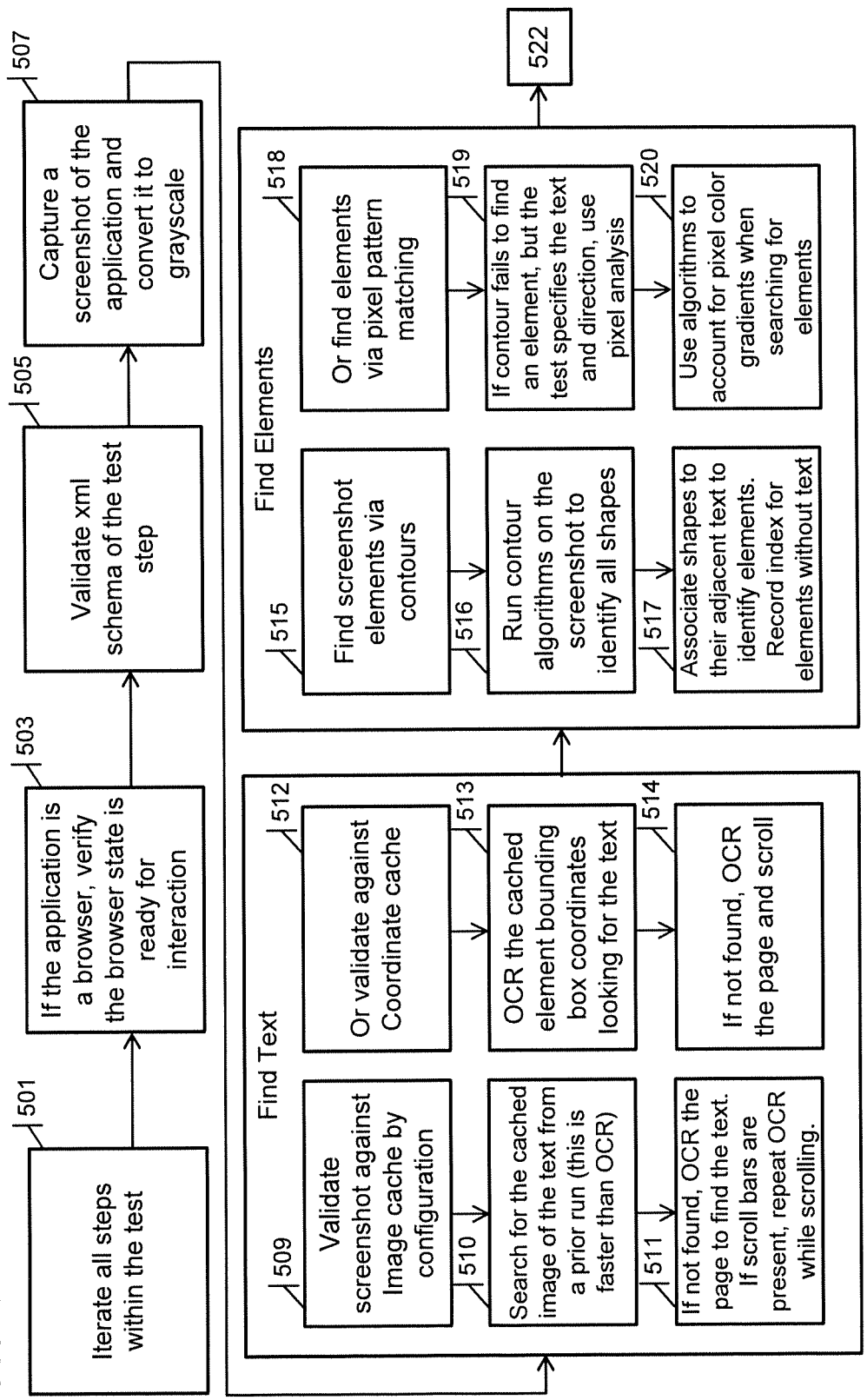
FIGS. 5A and 5B are high-level functional block diagram illustratively showing the operation of an automation tool like that shown in FIG. 1A.
Figure 5B:
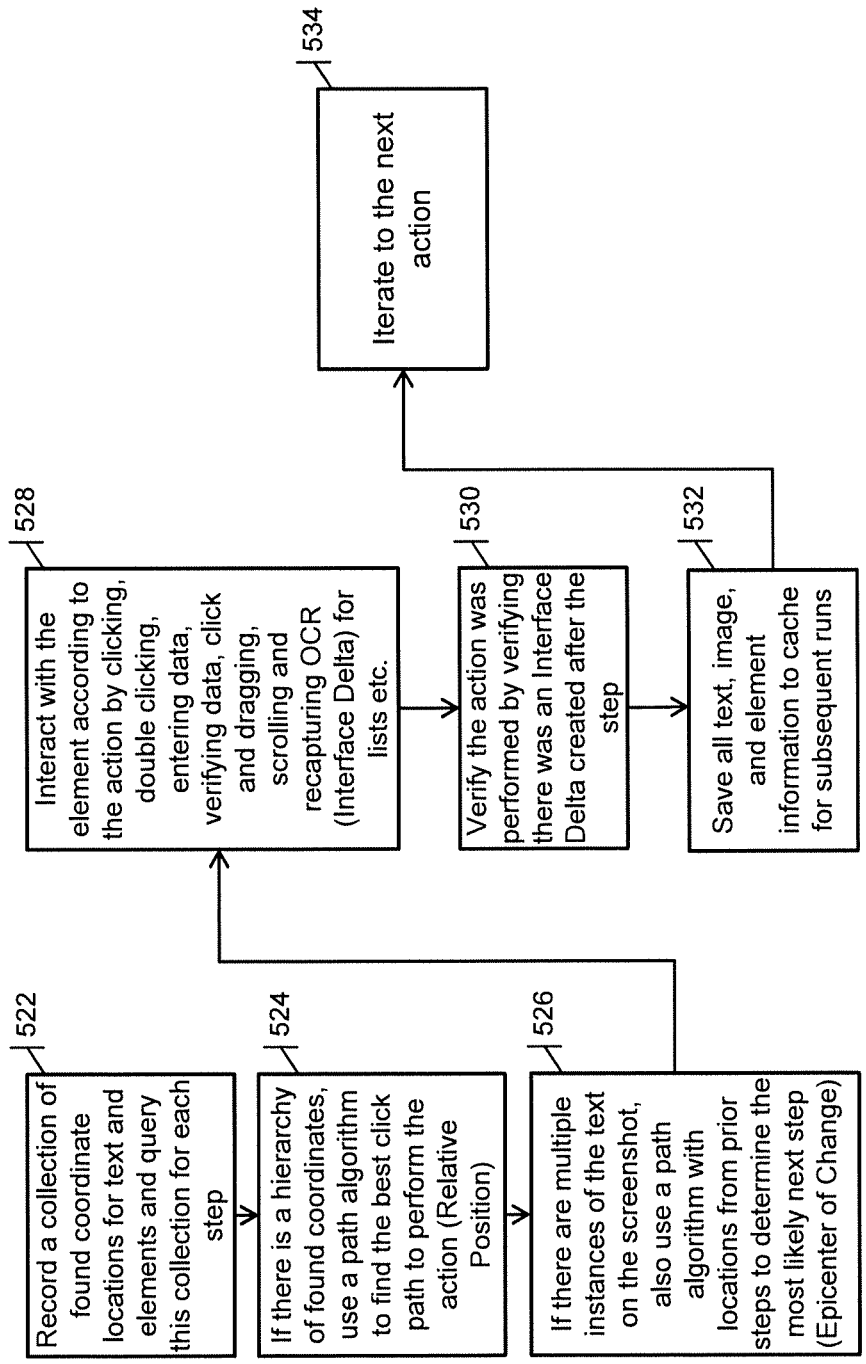

FIGS. 5A-5B are flow diagrams illustratively showing the operation of the automation tool 101 during execution of a test case on the application system under test 109.

The execution of the test case begins with step 501, which is iterated for each step within the test case. On each iteration, operation passes to step 503 in which the automation tool 101 verifies that a browser through which the application system 109 is accessed by the automation tool 101 is ready for interaction. Note that while the application system 109 can be accessed through a browser (e.g., in the case of a web-oriented application system 109), the automation tool 101 can also be used to interface with other types of application systems. In embodiments in which a test case is stored as an extendable markup language (XML) file, the automation tool may validate the XML schema of the test in step 505.

The automation tool 101 captures a screenshot of the GUI interface of the application system 109 and optionally converts the screenshot to grayscale in step 507. The automation tool 101 optionally converts the application screenshot to grayscale in order to improve the OCR capture accuracy by eliminating colored text inaccuracies. In turn, the automation tool 101 processes the grayscale image. First, the automation tool seeks to find all text in the image. While the automation tool 101 can use OCR of the captured screenshot image to retrieve text elements on a GUI page, the automation tool 101 may more efficiently retrieve text from the image by comparing the image to stored images—such as a stored image of the same GUI interface page which was stored during scanning and learning of the GUI page. During the learning process or prior test execution runs, an image of the OCR text can be saved after the automation tool OCRs the GUI page and gets all text and coordinates of the text. Finding and matching an image of the text element on the GUI page results in better performance than redoing an OCR of the GUI page on a subsequent execution run of the test. The logic is that the next test execution run will be similar to the prior test execution run, so the automation tool is able to find the user input object by cached image, not requiring a new OCR for each execution run. If the automation tool can't find the image, then it will be re-OCR or look for the user input object by relative position or another location strategy. As such, in steps 509-511, the automation tool 101 validates the screenshot against an image cache by configuration, and searches for the cached image of the text from a prior test execution run, and retrieves the OCR results from the prior run if a match is found. If no match is found, the automation tool performs OCR of the GUI page to find the text element, and repeats the OCR while scrolling through the page if scroll bars are present in the image. Additionally in step 512-514, the automation tool 101 can validate the image against a coordinate cache of coordinates of text elements from the GUI page (e.g., a coordinate cache established during scanning and learning of the GUI interface), and use the coordinate cache to perform OCR within a bounding box, an area around the user input object which contains the actual GUI user input object and text element, established according to the stored coordinates. If no match is found, the automation tool performs OCR of the GUI page to find the text element, and repeats the OCR while scrolling through the page if scroll bars are present in the image.

Additionally, the automation tool 101 seeks to find all objects in the image. For this purpose, in steps 515-517, the automation tool 101 finds screenshot elements/objects via contour analysis (e.g., as shown and described in relation to FIG. 3B), for example by running contour analysis algorithms on the screenshot to identify all shapes. Contour analysis is a computer vision technique which can be used to determine objects found on a GUI page. An example of contour analysis is a technique used by the OpenCV library. Specifically, contour analysis includes an analysis of colors and gradients and how these gradients map to single user input objects shown on the GUI page. The automation tool 101 then associates shapes to their adjacent text to identify elements, and records an index for elements without text. Alternatively or additionally, in step 518-520, the automation tool 101 finds elements via pixel pattern matching. In cases in which contour analysis does not perform well with an application system under test or fails to find expected user input objects, the automation tool can perform direct pixel analysis to determine the lines found on a GUI and find rectangles and squares which are assumed to be the user input objects or text elements. The automation tool performs pixel match and then follows the pixel match in the direction of the line to find the rectangles. Additionally, if contour-analysis fails to find an element during test execution, the automation tool 101 can rely on the data stored in the interface repository 110 and associated with the GUI page to identify a GUI object or element. For example, the automation tool can use pixel analysis combined with the stored information on the direction and offset between the text and the object/element to locate the object/element. Throughout execution, the automation tool 101 can use algorithms (e.g., CMCLC ratio) to account for pixel color gradients when searching for elements. CMCLC is a known and widely used algorithm that allows systems to ignore minor gradient differences in images that are being matched on a GUI. For example in FIG. 3F, the 'Add to Cart' button can be found on each row of a table using CMCLC even though the GUI page has a slight background gradient difference on each row. CMCLC can be used to recognize that these are all 'Add to Cart' buttons and not individually different buttons.

While the above discussion has focused on identifying the presence and location of text and GUI objects/elements using OCR and contour detection, the automation tool 101 also scans the GUI page for other interface elements and images. In particular, the automation tool 101 can store a database of images to be matched, such as images of known icons that the automation tool 101 can search for on a GUI page. The automation tool 101 can thus additionally be operative to find such icons on the GUI page, and to report the identity and locations of matches on the GUI page for use in future steps of GUI page scanning and learning and/or of test case execution.

By locating all text and objects/elements on the GUI page (e.g., in steps 509-520), the automation tool 101 establishes a collection of coordinate locations found for all text and objects/elements on the page (step 522). The collection of coordinates is used by the path algorithm to find the relative position of elements or determine the EoC. The collection of coordinate locations can be referenced in each subsequent step to determine the location of various elements on the GUI page. In cases in which a hierarchy of coordinates is used (e.g., when relative position coordinates are provided in a test case), a path algorithm can advantageously be used to find the best click path to perform a particular action that may be outlined in the test case (step 524). In cases in which a screenshot includes multiple instances of same text or label, the automation tool 101 may also use a path algorithm to identify locations of the same text/label that are the most likely to correspond to the appropriate text/label (step 526). For example, the automation tool 10 may identify the text/label that is closest to or that is positioned at an appropriate location relative to a text, label, object, or element referenced in a prior or following step. For example, the "Submit" button that is located to the right of or below an object/element used in a preceding step may be selected as the most likely "Submit" button. More generally, the automation tool may use epicenter of change (EoC) calculations as outlined above to determine the appropriate text/label on the GUI page.

In turn, in step 528, the automation tool 101 interacts with the GUI objects/elements identified in the test case according to the action identified in the test case and test case dataset. As such, the automation tool 101 can interact with an element/object according to the action specified in the test case and dataset by clicking, double clicking, entering data, verifying data, clicking and dragging, scrolling, and the like. The automation tool 101 may also cause lists and combo boxes to expand as part of performing an action, so as to capture OCR text from the expanded items and search for a desired value (e.g., a value identified in the dataset values associated with the test case being executed) in the expanded item. If the desired value is not found, vertical scrolling is automatically performed to find the value through repeated OCR. Following execution of the action, the automation tool 528 verifies that the action was accurately performed by computing an interface delta between the GUI page captured prior to the action and the GUI page captured after the action, and verifying that the interface delta accurately reflects the step or action taken (step 530).

Throughout execution of the test cases, the automation tool 101 stores all text, images, and object/element information to cache for use in subsequent runs and for use in verification and debugging (step 532). Among other items stored in cache, overlay templates can be stored as part of recording where logical names of interfaces are expected to appear for a specific application under test. In turn, as step 534, operation returns to step 501 for execution of a next step in the test case.

Once all steps of the test case are performed, the automation tool 101 provides an execution summary report that shows all steps including data used and screenshots of the application from each step. The pass or fail status can be shown for each step along with detailed information used for debugging failed steps. When reviewing the execution summary report, a user can also access stored screenshots obtained during execution of every step in the test case and identifying the interface objects/elements that automation tool interacted with during execution.

The automation tool 101 presents several notable advantages over prior systems used to develop automated tests. The automation tool 101 advantageously: (i) uses text OCR technology to find label information on screenshots of the application being tested, along with image pattern matching and shape pattern matching to find associated objects on the image, and then identifies the type of object and interacts with the object appropriately for the purpose of automation testing; (ii) uses logic to understand the objects which are found and is then able to interact with them as a user would via computer automation for the purpose of testing; (iii) finds objects relative to images, not just OCR text; (iv) finds objects relative to other elements on the screen; (v) interprets the changes which occur as the test executes, and directs new actions to the most likely locations on the screen based on the observed changes; (vi) understands the state of objects, such as checkboxes checked, radios selected, lists selected, and text fields with data filled in, and interacts with the objects appropriately based on the current state; (vii) learns and executes tests without prior app knowledge; (viii) interprets the available actions for objects which are found; (ix) recognizes similar objects (e.g., to automatically enter the same information in similar fields on different pages); (x) recognizes complex structures of data such as tables, grids, and trees, and the relatively located objects associated with these structures; (xi) finds objects based on limited and partial information when driven from an existing test case; (xii) is compatible with scanning paper or pdf forms, with computer desktop images on the desktop directly under test, and with forms/interfaces accessed via a virtual network computing (VNC) session; (xiii) performs analysis and processing at runtime/or stores a cached 'virtual object mapping' of the app; (xiv) finds and then interacts with the forms and objects directly, not just reading them; and (xv) knows how to identify, process, and interact with object types that wouldn't be on paper forms, like combo boxes, trees, or the like.

The automation tool 101 can additionally be used to perform functions such as: (i) capture the physical properties of the objects by initially finding them with this technology, but use these physical properties for future executions in traditional tools to speed the execution and gain better maintainability or allow export to common tools; (ii) record a video session of a manual test execution and then generate the test case which was run by analyzing the changes to the page and the movement of the mouse cursor, mouse clicks, and keyboard presses; (iii) create an Interface Repository page and object library mapping from scanning images of the pages in an application; (iv) find and understand the same object in different applications by learning aspects of the object such as performing cross-browser testing by understanding each object as it appears differently in all browsers; (v) perform automated execution of test cases in areas that have been changed in an application by reviewing page changes in prior executions and suggesting or scheduling tests to execute related to the changed interfaces; (vi) highlight areas of an application or individual objects which do not have test cases in the repository; and/or (vii) generate new test cases based on learned interactions such as field masks, field sizes, static list selections, or the like.

The automation tool 101 can be used as a step execution driver for software test automation test case steps sent from an automated testing framework or test automation tool. The automation tool 101 can also capture the Interface Repository Object Mapping of the application being tested. The system can replace the role of traditional commercial automation engines (such as HP QTP, IBM RFT, and others) in automation solutions where applicable. The automation tool 101 further provides a simpler and more flexible system than existing testing tools for solutions where manual testers create automated test cases without coding.

The automation tool 101 takes a completely different non-invasive approach to automation where prior tools require a look into the application object properties to find the objects and interact with them. The prior tools' approach results in much higher setup costs and longer timeframes for setup of such other tools in comparison to the automation tool detailed herein. The prior tools often require experts who are programmers which are expensive and difficult to find in the testing market, and the maintenance of the prior tools is also very expensive and must be performed by these coders. This disclosure thus describes a more user friendly tool which can be used by non-coders, has less setup costs, and less maintenance costs.

The automation tool 101 generally performs recognition of a page as part of its operation. In some situations, the automation tool 101 must access portions of a webpage that are not currently visible in order to complete the testing. As such, the automation tool can automatically scroll down on a list to find objects, or scroll down through a list of objects within a list box, in order to identify all objects (and listed values/options in a list box) for future use in creating and executing tests.

Various additional features of the automation tool 101, and of the test computer executing the automation tool 101, are outlined throughout this disclosure. In particular, the automation tool may be used as part of a system for scanning an application system 109, learning its aspects, and making the captured information available to a test automation system (TAS) where users build test cases which execute repeatedly against the application system 109 being tested.

The automation tool 101 may further be used to implement any of the methods outlined above based on the following.

The automation tool 101 can learn GUI windows, pages, dialogs, screens, palette windows, frames, or other interface objects which contain GUI elements by analyzing the image of the GUI and identifying the rectangular border, title text at the top left, icons for closing or maximizing in the top right, a header or menu bar under the title, content for the window in the middle under the menu bar, scroll bars on the right side for vertical scroll and on the bottom for horizontal scroll, or a status bar at the bottom. The automation tool 101 can further scroll through the interface so as to capture the entire body of a GUI page and make elements and their scroll locations available to the test system. During test execution, the automation tool 101 can navigate through the GUI page and interact with objects therein based on the scrolling data.

The interactions of the automation tool 101 with various types of GUI objects are described in more detail below.

With regard to Edit boxes, the automation tool 101 can analyze the image of a field and identify adjacent text or internal text which is a logical name for a generally rectangular shaped control. The automation tool 101 can determine if the edit box is single line or multiline, and whether the field is a required field. The automation tool 101 can further identify the field even if data has been entered and has overwritten the logical name of the field. The automation tool 101 can determine the character mask and field length for the field when data is entered for testing, for example by clicking into the field, selecting all text (so as to select text that may be visibly truncated in the field display), copying the text to a clipboard in the operating system, and verifying the text from the operating system clipboard.

With regard to Hyperlinks, the automation tool 101 can analyze the text and image of a field for the intention for clicking the text from a test case to determine the field is a link. The automation tool 101 can also identify links by finding text of a different color than the surrounding text, text which is underlined, or text which supplies a URL in the status bar when the mouse is hovered. The automation tool 101 may click and verify the link when supplied only a portion of the link text or the full link text, and may further understand the GUI interface navigated to by the system when links are clicked and determine if the interface is statically linked.

The automation tool 101 can learn Dropdowns and Combo Boxes by analyzing the image of the field and identifying a dropdown icon and associated text field and logical name; opening the dropdown by clicking the icon; analyzing the Epicenter of Change and Interface Delta to define the list area as expanded on the interface; performing OCR on list values and selected value; storing the list values and scrolling the list to obtain all values; recording the number of scrolls required to access a value for better performance reasons; making a determination if the list is static or dynamic based on prior learned information; and making the list available for test creation and editing. The automation tool 101 may also be configured to type text directly into Combo boxes as well.

In terms of list boxes, the automation tool 101 learns List boxes by analyzing the text and image of a field and determining if an object is a List according to the following attributes: Lists are generally tall rectangles with list items inside. The items can be selected or multi-selected or moved between other lists on occasion. List items which are highlighted generally would have white text on a colored background inside the list or simply greyed. The automation tool 101 is configured to: interface with buttons between two lists which allow moving items between the two and with scrollbar(s) inside the list; to retrieve a logical name generally located above the list; identifying simple elements such as checkboxes inside the list on items; to select items, multi-select, deselect, scroll to find items; and to verify what has been selected even if scrolling is required, and verify all items available in the list.

With regard to Check boxes, the automation tool 101 analyzes a field and recognizes a check box in response to finding a small square input with adjacent identifying text. The automation tool 101 is configured to: determine a state of the check box by image analysis for checked, unchecked, or triple checked; identify check boxes inside other larger elements such as lists, grids, tables, and trees; identify adjacent text as the logical name of the check box, and use the entire text or a portion of the text to interact with the check box; and verify the state of the check box by performing image analysis primarily and image match secondarily.

The automation tool 101 recognizes Radio Buttons by analyzing a field and finding a small circular input with adjacent identifying text. The automation tool 101 is configured to: determine the state of the radio by image analysis for selected or unselected; identify adjacent text as the logical name of the radio, and optionally to use the entire text or a portion of the text to interact with the radio; verify the state of the radio by performing image analysis primarily and image match secondarily; group Radio Button Groups by identifying the spacing and Relative Position of adjacent radios with no separating text or objects, analyzing the current selection in the radio group, and understanding how to select each individual radio based on its logical name or associated text, image, or object identifier. The automation tool 101 may recognize that radios always appear in pairs or larger groups.

Buttons are recognized by analyzing the field as generally a rectangle with colors different than the Interface background and with logical text inside the control. The automation tool 101 is configured to: read the button text, click the button, and verify the Interface Delta and Epicenter of Change after the action; verify the logical text value and also whether the control is enabled or disabled; and verify the control selection primarily by OCR, then by image match.

The automation tool 101 learns Text Labels on a GUI page by OCR. The automation tool 101 is configured to verify the full or partial text by triple clicking the mouse to select the text or clicking and dragging the mouse to select the text, copying it to the operating system clipboard, and verifying it from the clipboard primarily; or verification via OCR secondarily; or image match verification as a final result. The automation tool 101 is further configured to: associate the Text Labels as Logical Names of their adjacent and associated controls; recognize Labels separately from Static Text not associated to GUI elements; and identify controls by Text Labels for localized applications in languages other than the base language by using a label text mapping dictionary with translation entries for text in each language.

The automation tool 101 identifies Static Text on an Interface by OCR. The automation tool 101 is configured to: verify the full or partial text by clicking and dragging the mouse to select the text, copying it to the Windows clipboard, and verifying it from the clipboard primarily; or verification via OCR secondarily; or image match verification as a final result.

The automation tool 101 recognizes Cycle Buttons by analyzing when a same button on a same interface changes its presentation text when clicked multiple times, or when the button has a dropdown like icon on the button but it is not a dropdown and rather cycles the button text. The automation tool 101 is configured to: read the button text, click the button, read the text again, and repeat clicking until the desired value is displayed; cache the number of clicks required to achieve the desired value; return all the valid values to the Test Automation System for selection by users; verify the selected value and also whether the control is enabled or disabled; and verify the control selection primarily by OCR, then by image match.

The automation tool 101 recognizes Grids, Tables, and Web Tables by identifying structure in position and alignment of displayed text, images, or elements on a GUI interface. In particular, one or more of the following structures may be identified: tables contain Headers which separate the columns and Rows of objects or data with each cell under a column separated by whitespace or horizontal and vertical lines; the values are generally right, left, or center justified to the Headers; rows may be all the same color, or may have an alternating background color; the Table may or may not have pagination or scroll bars; the Table may have a logical name which identifies it above it, or if only one table is found on the Interface, then the logical name may be implied from the Interface name. The automation tool 101 is configured to: allow interacting with all the elements in the table, for verifying all or any value(s) in the table, for finding values based on other values in columns or rows and generally the ability to use all the Relative Position identifiers to find and interact with the Table data and objects.

The automation tool 101 recognizes both vertical and horizontal Scrollbars and learns how many scrolls are required to reach a desired element, text, or image on a GUI interface. Some Interfaces are dynamic in size and thus will not have this caching enabled. The automation tool 101 is configured to: click the scroll arrows to advance a line, click inside the field next to the arrows to advance a page, click at a percentage of the total scroll distance, or click and drag from one location to another. The tool can quilt together all GUI page images of a scrollable Interface to form a larger image of the entire Interface without scrolls. The tool can further use page up, page down, right, left, up, down arrow keys on the keyboard after clicking into the interface to scroll the Interface.

As part of scanning and learning of an interface, the automation tool 101 can further hover a mouse cursor over text, partial text, images, partial images, images with percentage accuracy parameters, objects, coordinates, and relative coordinates on an Interface. The automation tool 101 can perform any of the click actions after the hover, or move and hover the mouse to another desired location in a series of hovers as when navigating an on-hover menu on a GUI.

In order to access and interact with menus, the automation tool can further learn Menus by capturing the text via OCR, clicking the expandable menu items, capturing the Epicenter of Change, again recognizing the text, and storing the menu structure and path to get to each menu item in the interface repository 110 and making the selections available to users in the Test Automation System. The tool 101 can expand and allow selection of the items in the menu, and can verify menus via OCR primarily and Image match of the individual selections secondarily.

The automation tool 101 can learn Tree controls by identifying hierarchical views of information on an Interface via OCR and image analysis. The identification can be made based on one or more of the following characteristics: trees often have lines and plus and minus expansion anchors; there may be scrollbars around Trees; tree Items are most often left justified and equal distance indented and with equal spacing between items. The automation tool 101 can be configured to: click, double click, right click, drag and drop, and hover Tree items; expand and cache in the interface repository 110 item locations; identify and interact with Objects which may be in the Tree items such as Check boxes; and verify Tree items via OCR primarily and Image match secondarily.

The automation tool 101 can learn Slider controls by image analysis of the field. The automation tool 101 can be configured to: select a value in the slider by clicking a percentage of the length of the slider or dragging an anchor and dropping it at a percentage of the length. Sometimes there are notches in the slider length; thus, the tool 101 can be configured to allow moving up or down by one notch. The tool 101 may further recognize the displayed value of the slider, a percentage range in which the slider anchor is sitting in the length, and finally via image match.

The automation tool 101 can learn a Spinner control by image analysis and OCR of the value. The automation tool 101 may allow clicking up and down on the arrow to increase or decrease or cycle the spinner. The logical name may be adjacent to the Spinner. The tool 101 may increment, decrement, or enter a value directly into the display field of the Spinner if allowed.

The automation tool 101 can learn a Tab control via image analysis and OCR. Tabs are clickable areas on an Interface which are grouped adjacent and allow switching the Interface to other primary views. Tabs may have lines or rectangles which separate them. Tabs are found on the edges above, below, to the right, or left of a containing rectangle or square with other objects inside. Tabs may have an "X" on them which allows closing the Tab. The Tab may have an icon or simply text which is the logical name of the tab and the OCR text to click. Inactive tabs are shown as greyed and the active tab is not greyed and has its bounding rectangle missing the portion which touches the main content area. The tool 101 may allow clicking Tabs and verifying they take focus, and may verify Tabs through OCR, image analysis, and image match.

The automation tool 101 can learn a Toolbar control via image analysis and OCR. Toolbars are buttons which appear adjacent and within a group of Relative Position to each other. The tool 101 can recognize text, individual images or icons, and objects or elements in the Toolbar and make these available for user selection in the Test Automation System. Elements of the Toolbar can often be separated by the background color of the Toolbar, and the Toolbar generally is separated by background color of the Interface background. Toolbars are often found directly underneath Menu bars at the top of the Interface. There may be vertical or horizontal lines which separate the Toolbar buttons. The tool 101 identifies Toolbars which are non-modal pop-out dialogs which can be moved around the desktop.

The automation tool 101 can learn a Ribbon control which is a set of toolbars organized by Tabs such as in all of the top Microsoft Office products. Ribbons contain icons, text, and elements, and have areas which can be dropped down to reveal menu like information. The tool can verify elements of Ribbons via OCR, image analysis, and image match.

The automation tool 101 can learn an Infobar which is a non-intrusive/non-critical information bar which generally appears at the top of a page or near a control and sometimes displays only temporarily to show information or allow actions, but does not require immediate action. These are often seen on browsers to show security information or as feedback on GUI validation errors. The tool 101 recognizes the text and any objects or images in these Infobars, and can interact with the bars or pass back their existence in a test report for addition to the object mapping in the Test Automation System or for post execution verifications. Similar processing can be used to learn status bars. For example, the automation tool 101 can further learn Status bars by image analysis, OCR, or image matching; can read the status bars if text is available, analyze the percent complete, and verify the status; and can synchronize test execution with status bar completeness if status bars are used in the application under test.

The automation tool 101 can learn Accordion controls by image analysis or image matching. Accordions allow expanding, focusing, or hiding features or portions of an Interface. Users are able to click into the accordion or click the plus or minus type anchors to expand or contract the accordion. The tool 101 can interact with Accordions in order to expand all and capture all the various text, images, and elements which appear on Interfaces, and can cache the expansion needs in the interface repository 110 for accessing the GUI elements.

The automation tool 101 can learn Tooltips by hovering the mouse, capturing the Interface Delta and Epicenter of Change, and then recognizing the Tooltip with text OCR. The tool can verify Tooltips by full or partial OCR of the text primarily, or Image match secondarily.

The tool 101 can further identify the cursor on a GUI if visible and be able to tab to a particular field starting from the position of the cursor and tabbing until the desired field is reached.

The tool 101 can pause the test execution until certain text, image, or object is visible and enabled on the GUI interface.

The tool 101 can further identify unknown GUI elements on the screen and pass this information back to the Test Automation System for identification and inclusion in the test attributes for the system.

Aspects of the methods for automatically testing an application system graphical user interface (GUI) outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of the computer that will perform the automated testing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the automation tool 101 or application system 109. The software code is executable by the general-purpose computer that functions as one of the application servers 103 and 107. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for automated testing of application systems via GUIs in essentially the manner performed in the implementations discussed and illustrated herein.

Figure 7:
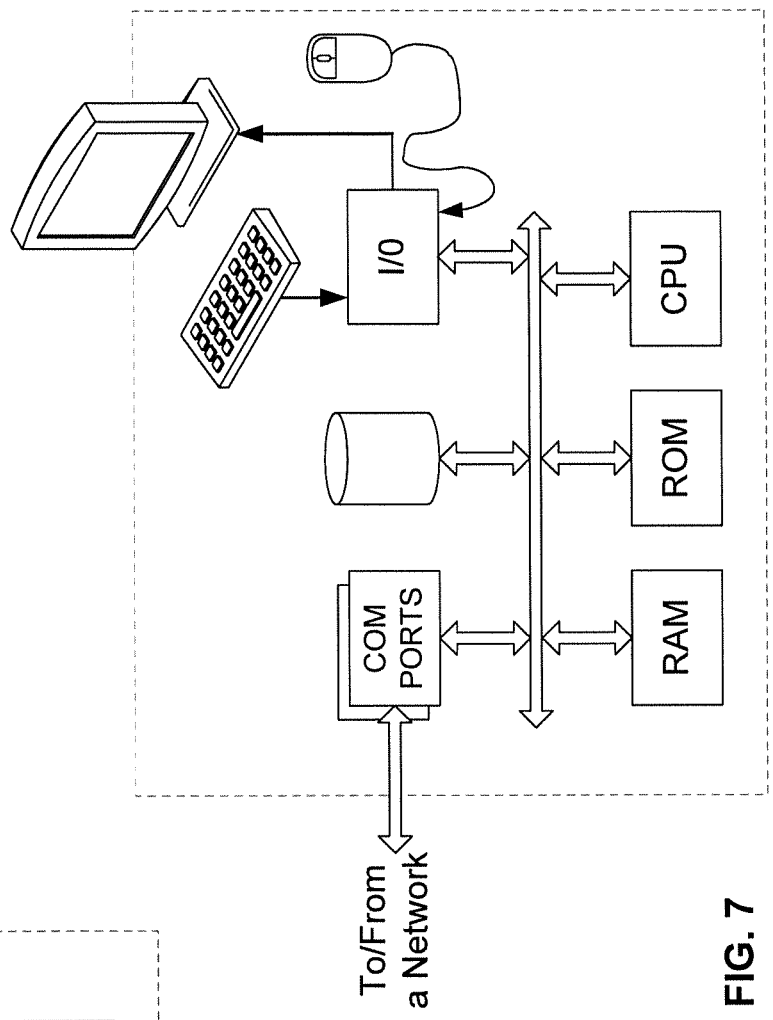
FIGS. 6 and 7 are simplified functional block diagrams of computers that may be configured as a host or server, for example, to function as one of the application servers in the system of FIG. 1A.
Figure 6:
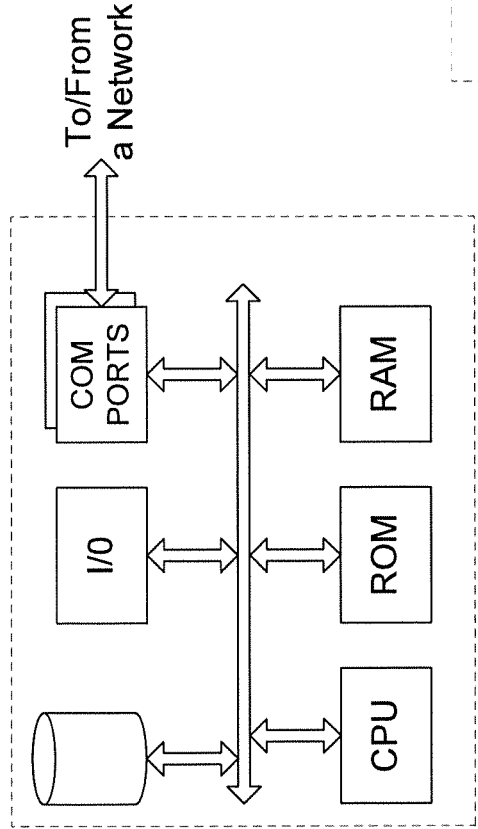

FIGS. 6 and 7 provide functional block diagram illustrations of general purpose computer hardware platforms that may be used to implement the application systems 103 and 107. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for automatically testing an application system graphical user interface (GUI), the method comprising:
retrieving, in a computer communicatively connected to an application server providing the application system, a GUI page provided by the application server as part of the application system;
automatically identifying, based on image-analysis of an image of the retrieved GUI page, a plurality of text elements of the GUI page;
automatically identifying, based on image-analysis of the image of the retrieved GUI page, a plurality of user input objects of the GUI page;
automatically associating with each of the plurality of automatically identified user input objects a text element of the plurality of automatically identified text elements;
retrieving, based on the text elements associated with each of the plurality of user input objects, a plurality of test parameter values from a database storing test parameter data, wherein each test parameter value of the plurality of test parameter values is associated in the database storing test parameter data with a corresponding text element associated with one of the plurality of user input objects;
testing the application system provided by the application server by, for each respective user input object identified in the GUI page, performing a function to:
provide, in the respective user input object of the GUI page, the respective test parameter value that is associated in the database storing test parameter data with a same text element as is associated with the respective user input object of the GUI page; and
monitoring a response of the application system to the providing of the respective test parameter value to each user input object identified in the GUI page.

2. The method of claim 1, wherein the user input objects on the GUI includes at least one of a button, a text input field, a list or combo box, a checkbox, and a radio button.

3. The method of claim 2, wherein the plurality of test parameter values include at least one of a click command to activate a button user input object, a text string for input into a text input field user input object, identification of an item to select in a list or combo box user input object, a check or uncheck command for input into a checkbox user input object, and identification of an item to select in a radio button selection user input object.

4. The method of claim 1, wherein the associating a text element of the plurality of identified text elements with an identified user input object comprises associating with the identified user input object a text element that is located proximate to or is overlapped with the identified user input object in the GUI page.

5. The method of claim 1, further comprising:
determining a type of a user input object of the plurality of user input objects of the GUI,
wherein the retrieving comprises retrieving, based on the text elements associated with each of the plurality of user input objects and based on the determined types of the each user input object, the plurality of test parameter values from the database storing test parameter data, wherein each test parameter value of the plurality of test parameter values is associated in the database storing test parameter data with the corresponding text element associated with one of the plurality of user input objects and associated in the database storing test parameter data with the type of the one user input object.

6. The method of claim 5, wherein the test parameter values "M", "male", "F", and "female" are associated with a text element "Gender" and with a radio button type of user input object in the database storing test data, wherein the test parameter value "jdoe@gmail.com" is associated with a text element "E-Mail Address" and with a text input field type of user input object in the database storing test data, and wherein the test parameter values 'check' and 'uncheck' are associated with a checkbox type of user input object in the database storing test data.

7. The method of claim 1, further comprising:
receiving, from a test developer, test parameter values to associate with one text element of the plurality of identified text elements; and
storing the received test parameter values in the database storing test parameter data in association with the one text element.

8. The method of claim 7, wherein the test parameter values are received from the test developer in response to prompting the test developer for test parameter values to associate with the one text element identified in the GUI page, and
wherein the test developer is prompted for the test parameter values following the identifying of the pluralities of text elements and user input objects and prior to the testing of the application system.

9. The method of claim 1, wherein the monitoring of the response of the application system comprises storing a log of monitored responses of the application system including stored screenshots of the GUI page following the providing of the respective test parameter values in the respective user input objects of the GUI page.

10. The method of claim 1, wherein the testing of the application system comprises:
executing a test case comprising an ordered sequence of actions to be performed on the application system providing the application system,
wherein the ordered sequence of actions include actions to provide the respective test parameter values in the respective user input objects of the GUI page.

11. The method of claim 10, wherein the retrieving the plurality of test parameter values comprises retrieving different pluralities of test parameter values for each of the plurality of identified user input objects, and
wherein the testing of the application system comprises repeatedly executing the test case on the application system by providing different combinations of test parameter values in the user input objects of the GUI page during each execution of the test case, and monitoring the response of the application system to each different combination of test parameters.

12. The method of claim 1,
wherein the identifying of the plurality of text elements of the GUI page comprises performing optical character recognition (OCR) of the GUI page to obtain text information of each text element of the GUI page and to obtain location information of each text element on the GUI page, and
wherein the identifying of the plurality of user input objects of the GUI page comprises performing contour analysis of the GUI page to identify the presence, type, and location of each user input object of the GUI page.

13. The method of claim 12,
wherein the identification of the pluralities of text elements and user input objects of the GUI page comprises:
automatically scrolling through the GUI page to obtain a plurality of images of different scrolled portions of the GUI page; and
identifying text elements and user input objects in each image of the plurality of images of different scrolled portions of the GUI page; and wherein the identifying of the plurality of user input objects comprises:
automatically expanding list or combo boxes of the GUI page and obtaining text information from the expanded list or combo boxes; and
storing the obtained text information from each expanded list or combo box with the information on the presence, type, and location of the list or combo box.

14. The method of claim 12, wherein the providing of the respective parameter values in the respective user input objects of the GUI page is performed at least in part based on the identified location of each user input object on the GUI page.

15. The method of claim 1, wherein the automatically associating comprises automatically associating with each of the plurality of automatically identified user input objects a text element of the plurality of automatically identified text elements based on relative positions of the text elements and user input objects in the image of the retrieved GUI page.

16. A system comprising:
a communication network;
a first application server connected to the communication network and providing across the communication network an application system having a graphical user interface (GUI); and
a second application server communicatively connected to first application server across the communication network, and configured to access the application system provided by the first application server across the communication network,
wherein the second application server is configured to perform functions to:
retrieve a GUI page provided by the first application server as part of the application system;
automatically identify, based on image-analysis of an image of the retrieved GUI page, a plurality of text elements of the GUI page;
automatically identify, based on image-analysis of the image of the retrieved GUI page, a plurality of user input objects of the GUI page;
automatically associate with each of the plurality of automatically identified user input objects a text element of the plurality of automatically identified text elements;
retrieve, based on the text elements associated with each of the plurality of user input objects, a plurality of test parameter values from a database storing test parameter data, wherein each test parameter value of the plurality of test parameter values is associated in the database storing test parameter data with a corresponding text element associated with one of the plurality of user input objects;
test the application system provided by the first application server by, for each respective user input object identified in the GUI page, performing a function to:
provide, in the respective user input object of the GUI page, the respective test parameter value that is associated in the database storing test parameter data with a same text element as is associated with the respective user input object of the GUI page; and
monitor a response of the application system to the providing of the respective test parameter value to each user input object identified in the GUI page.

17. A non-transitory machine-readable medium comprising instructions stored therein, which when executed by a processor, cause the processor to perform operations for automatically testing an application system graphical user interface (GUI) comprising operations to:

retrieve, in a computer communicatively connected to an application server providing the application system, a GUI page provided by the application server as part of the application system;

automatically identify, based on image-analysis of an image of the retrieved GUI page, a plurality of text elements of the GUI page;

automatically identify, based on image-analysis of the image of the retrieved GUI page, a plurality of user input objects of the GUI page;

automatically associate with each of the plurality of automatically identified user input objects a text element of the plurality of automatically identified text elements;

retrieve, based on the text elements associated with each of the plurality of user input objects, a plurality of test parameter values from a database storing test parameter data, wherein each test parameter value of the plurality of test parameter values is associated in the database storing test parameter data with a corresponding text element associated with one of the plurality of user input objects;

test the application system provided by the application server by, for each respective user input object identified in the GUI page, performing a function to:

provide, in the respective user input object of the GUI page, the respective test parameter value that is associated in the database storing test parameter data with a same text element as is associated with the respective user input object of the GUI page; and monitor a response of the application system to the providing of the respective test parameter value to each user input object identified in the GUI page.

* * * * *